United States Patent [19]
Maclinovsky

[11] Patent Number: 6,075,541
[45] Date of Patent: Jun. 13, 2000

[54] TOPOGRAPHIC TRIANGULATION IN REDUCED TIME

[75] Inventor: Natalia Maclinovsky, Wellington, New Zealand

[73] Assignee: Trimble Naviagtion Limited, Sunnyvale, Calif.

[21] Appl. No.: 08/966,434

[22] Filed: Nov. 7, 1997

[51] Int. Cl.[7] ............................................... G06F 15/00
[52] U.S. Cl. ............................................................. 345/423
[58] Field of Search ...................................... 345/433, 423

[56] References Cited

U.S. PATENT DOCUMENTS

| | | | |
|---|---|---|---|
| 5,307,292 | 4/1994 | Brown et al. | 364/564 |
| 5,317,681 | 5/1994 | Glassner | 395/141 |
| 5,333,248 | 7/1994 | Christensen | 345/442 |
| 5,367,465 | 11/1994 | Tazawa et al. | 364/468 |
| 5,428,717 | 6/1995 | Glassner | 395/123 |
| 5,440,674 | 8/1995 | Park | 395/123 |
| 5,590,248 | 12/1996 | Zarge et al. | 345/421 |

OTHER PUBLICATIONS

Fang et al., "Delaunay Triangulation Using a Uniform Grid", University of South Florida, IEEE Computer Graphics & Applications, May 1993.

C.M. Gold, T.D. Charters, and J. Ramsden, "Automated Contour Mapping Using Triangular Element Data Structures and an Interpolant Over Each Irregular Triangular Domain," pp. 170–175, Proceedings of SIGGRAPH, San Jose, CA, 1977.

Anthony Mirante and Nicholas Weingarten, "The Radial Sweep Algorithm for Constructing Triangulated Irregular Networks," IEEE Computer Graphics & Applications, pp. 11–13 and 15–21, May 1992.

Tsung–Pao Fang and Les A. Piegl, "Delaunay Triangulation Using a Uniform Grid," IEEE Computer Graphics & Applications, pp. 36–47, May 1993.

*Primary Examiner*—Mark K. Zimmerman
*Assistant Examiner*—Chante' Harrison
*Attorney, Agent, or Firm*—John F. Schipper

[57] ABSTRACT

Method and system for rapid triangulation of a region into an array of triangles that can be used for a GIS triangulation. A dataset S of three or more distinct points is set down, and an array including a sequence of triangles is constructed, using these points as vertices. A triangle is removed from the array if at least a triangle included angle is greater than a selected threshold angle value (such as 90°) or if the ratio of triangle height to triangle width is too large. A first triangle is replaced in the array by one or more other triangles if a first triangle included angle is less than an included angle for a second triangle, formed by replacing the first triangle included angle vertex by another point in the dataset S. The new method provides an acceptable triangulation, with computation time equal to about 40 percent of the time required for a Delaunay triangulation using the same dataset S. The dataset and/or the array of triangles can be displayed and manipulated.

20 Claims, 47 Drawing Sheets

FIG. 1

Finishing the first row:

The top list: P2-P3-P4-P5;
The bottom list: P5-P4-P3-P1-P2.

FIG. 4

Adding the point P7 (P7 is in the same row as P6, so we check the triangle P2 P3 P6 and replace it):

The top list: P2-P6-P7-P3-P4-P5;
The bottom list: P5-P4-P3-P1-P2 (the same).

Point P10:

The top list: P2-P6-P7-P8-P9-P5-P10;
The bottom list: P10-P5-P4-P3-P1-P2.

Point P12:

The top list: P11-P6-P7-P8-P12-P9-P5-P10;
The bottom list: P10-P5-P4-P3-P1-P2-P11 (the same).

Point P13:

The top list: P11-P6-P7-P8-P12-P9-P5-P10;
The bottom list: P10-P5-P4-P3-P1-P2-P11 (the same).

Point P16 (P16 is in the same row as P15, so we check the triangle P14 P10 P15 and reform it):

The top list: P11-P6-P7-P8-P12-P15-P16-P10;
The bottom list: P10-P5-P4-P3-P1-P2-P11 (the same).

Point P21:

TL: P11-P21-P6-P7-P8-P12-P15-P16-P10-P17-P19-P20;
BL: P20-P19-P18-P17-P10-P5-P4-P3-P1-P2-P11.

Point P22:

TL: P11-P21-P6-P7-P8-P12-P22-P15-P16-P10-P17-P19-P20;
BL: P20-P19-P18-P17-P10-P5-P4-P3-P1-P2-P11.

Point P23:

TL: P11-P21-P6-P7-P8-P12-P22-P23-P15-P16-P10-P17-P19-P20; bottom list the same.

Point P24:

TL: P11-P21-P6-P7-P8-P12-P22-P23-P24-P15-P16-P10-P17-P19-P20; bottom list the same.

Point P27:

TL: P11-P21-P6-P8-P12-P26-P23-P25-P27-P16-P10-P17-P19-P20; bottom list the same.

Point P28 (difference between P28 and the current edge is 4 rows so we try to fill the gap first):

TL: P11-P21-P6-P8-P12-P26-P23-P25-P27-P16-P10-P17-P19-P20; bottom list the same.

Point P28 (difference between P28 and the current edge is still 4 rows so we try to fill the gap again):

TL: P11-P21-P12-P26-P23-P25-P27-P16-P10-P17-P19-P20; bottom list the same.

Point P29:

TL: P11-P21-P28-P29-P26-P23-P25-P27-P16-P10-P17-P19-P20; bottom list the same.

Point P32:

TL: P11-P21-P28-P30-P31-P32-P23-P25-P27-P16-P10-P17-P19-P20;
bottom list the same.

Point P33:

TL: P11-P21-P28-P33-P30-P31-P32-P23-P25-P27-P16-P10-P17-P19-P20;
bottom list the same.

Point P35:

TL: P11-P21-P28-P33-P34-P35-P31-P32-P25-P27-P16-P10-P17-P19-P20;
bottom list the same.

Point P36 (reform the triangles):

TL: P11-P21-P28-P33-P34-P35-P36-P31-P32-P23-P25-P27-P16-P10-P17-P19-P20;
bottom list the same.

Point P37:

TL: P11-P21-P28-P33-P34-P35-P36-P31-P37-P32-P23-P25-P27-P16-P10-P17-P19-P20;
bottom list the same.

Point P38 (triangle P23 P25 P38 is a thin vertical triangle, so we check the neighboring edges first):

TL: P11-P21-P28-P33-P34-P35-P36-P31-P37-P32-P25-P27-P16-P10-P17-P19-P20; bottom list the same.

Point P38 (remove the acute angle):

TL: P11-P21-P28-P33-P34-P35-P36-P31-P37-P32-P27-P16-P10-P17-P19-P20;
bottom list the same.

Point P38 (remove the acute angle: P37 P32 P38 is a thin vertical triangle, so we check the neighboring edges and reform the triangle P31 P32 P37):

TL: P11-P21-P28-P33-P34-P35-P36-P31-P37-P38-P27-P16-P10-P17-P19-P20; bottom list the same.

Adding boundary triangles:

TOPOGRAPHIC TRIANGULATION IN REDUCED TIME

FIELD OF THE INVENTION

This invention relates to triangulation of a two-dimensional surface for purposes of GIS analysis and processing.

BACKGROUND OF THE INVENTION

Construction a geographic information system (GIS) associated with a two-dimensional region representing a surface S, such as a portion of the Earth's surface, often requires decomposition of the region into an assembly of polygonal structures that define and completely cover the region. Given a finite set P of spaced apart points on, and representing, the surface S, one must first determine a convenient array of polygonal structures. Several polygon array construction methods, having different advantages and disadvantages, are available here.

One of the most attractive polygon structures for the set P of points is a set D of Delaunay triangles, with each triangle in the set D having the property that the circle that circumscribes the triangle and passes through its three vertices includes no other point from the set P. Properties of this set D of triangles were discussed by B. Delaunay in "Sur las sphere vide" Bulletin of the Academy of Sciences of the U.S.S.R., VII, Classe Sci. Mat. Nat., pp. 793–800 (1934) and in "Neue Darstellung der geometrischen Krystallographie," Zeitschrift fur Krystallographie, vol. 84 (1932), pp. 109–149. A Delaunay triangulation of a surface is a dual of a Voronoi diagram, obtained by constructing perpendicular bisectors of a selected set of lines joining the points P. These diagrams were discussed by G. Voronoi in "Nouvelles applications des parametres continus a la theorie des formes quadratiques," J. reine und angewandte Mathematik, vol. 133 (1907), pp. 97–178. An approach to Delaunay triangulation is discussed by T-P Fang and L. A. Piegl in "Delaunay Triangulation Using a Uniform Grid," I.E.E.E. Computer Graphics & Applications, vol. 13, no. 3 (May 1993) pp. 36–47.

Another triangulation method, called the "radial sweep method," chooses a central point in the set P and determines the bearing and length of lines to all other points in the set P, beginning at the central point. These lines are sorted based on bearing, and long thin triangles are formed. This triangulation is not equivalent to Delaunay triangulation. The radial sweep method is discussed by Mirante and Weingarten, "The radial sweep algorithm for constructing triangular irregular networks," I.E.E.E. Computer Graphics & Applications, vol. 23 (1982) pp. 11–21.

A third triangulation method, referred to as the "point insertion method," begins with a universal triangle UT that surrounds all the points in the set P and a first point p' within UT that is not in the set P. Each beginning triangle is divided into three other triangles, with a new point (initially p') serving as a vertex of each of these triangles. This division process continues until each point in the set P belongs to a different triangle. This triangular decomposition is then optimized by analyzing quadrilaterals formed by two contiguous triangles with a common triangle edge. The result of this process is also not equivalent to Delaunay triangulation but has the advantage that modification of the resulting triangle structure due to deletion of a point in P, or insertion of a new point into P, is accomplished relatively quickly. In a true Delaunay triangulation, deletion or insertion of a point requires that the whole triangulation procedure be repeated. The point insertion method is discussed by Gold, Chambers and Ramsden in "Automated contour mapping using triangular element data structures and an interpolant over each irregular triangular domain," Proc. of SIGGRAPH, 1977, San Jose, Calif. pp. 170–175.

Some U.S. patents also disclose approaches for decomposition or representation of a topographic surface by a polygonal array. These include U.S. Pat. No. 5,307,292, issued to Brown et al, U.S. Pat. Nos. 5,317,681 and 5,428,717, issued to Glassner, U.S. Pat. No. 5,333,248, issued to Christensen, U.S. Pat. No. 5,367,465, issued to Tazawa et al, U.S. Pat. No. 5,440,674, issued to Park, and U.S. Pat. No. 5,590,248, issued to Zarge et al.

The methods disclosed in these articles and patents have some limitations. In most instances, these methods are not equivalent to the preferred Delaunay triangulation approach. All methods appear to require computation times that are similar to the computation time required for a straightforward Delaunay triangulation, which is often measured in tens of minutes or hours for a realistically complex point set P. What is needed is an approach that approximates Delaunay triangulation but substantially reduces the computation time.

SUMMARY OF THE INVENTION

The invention meets these needs by providing a procedure and system for construction of a triangulation for a region, with reduced computation time, that approximately satisfies the Delaunay criterion. The invention does not require a global search for new triangle edges each time a new point is added. The invention use the current edge for the (partial) triangulation constructed thus far to check for compliance locally with a few simple conditions, for any new candidates for addition to the triangulation scheme.

Beginning with a dataset of points in a region and a (rectangular) grid imposed on the dataset, the goal is to construct a sequence of triangular cells in which (1) each vertex of each triangle is a point from the dataset, (2) each point in the dataset is a vertex of at least one triangle and (3) the triangle interiors are non-overlapping. The grid defines a sequence of consecutive rows, numbered 1, 2, ..., M ($M \geq 2$). Row number 1 contains at least one point from the dataset, and at least two points are contained in separate rows.

One or more points from row number m' ($1 \leq m' \leq M-1$) and two or more points from row m' or from row m" ($m' < m'' \leq M$) are used to construct a triangle in a process that proceeds sequentially row-by-row. Tests for thin vertical triangles and for non-acute interior angles are also applied to remove non-qualifying triangles from the model.

BRIEF DESCRIPTION OF THE DRAWINGS

FIG. 1 is an example of a set of initial points and a corresponding initial grid to which the invention can be applied.

FIGS. 3–44 illustrate, by way of the example shown in FIG. 1, a procedure for defining and adding new triangles according to the invention.

DESCRIPTION OF BEST MODE OF THE INVENTION

Figure 2:
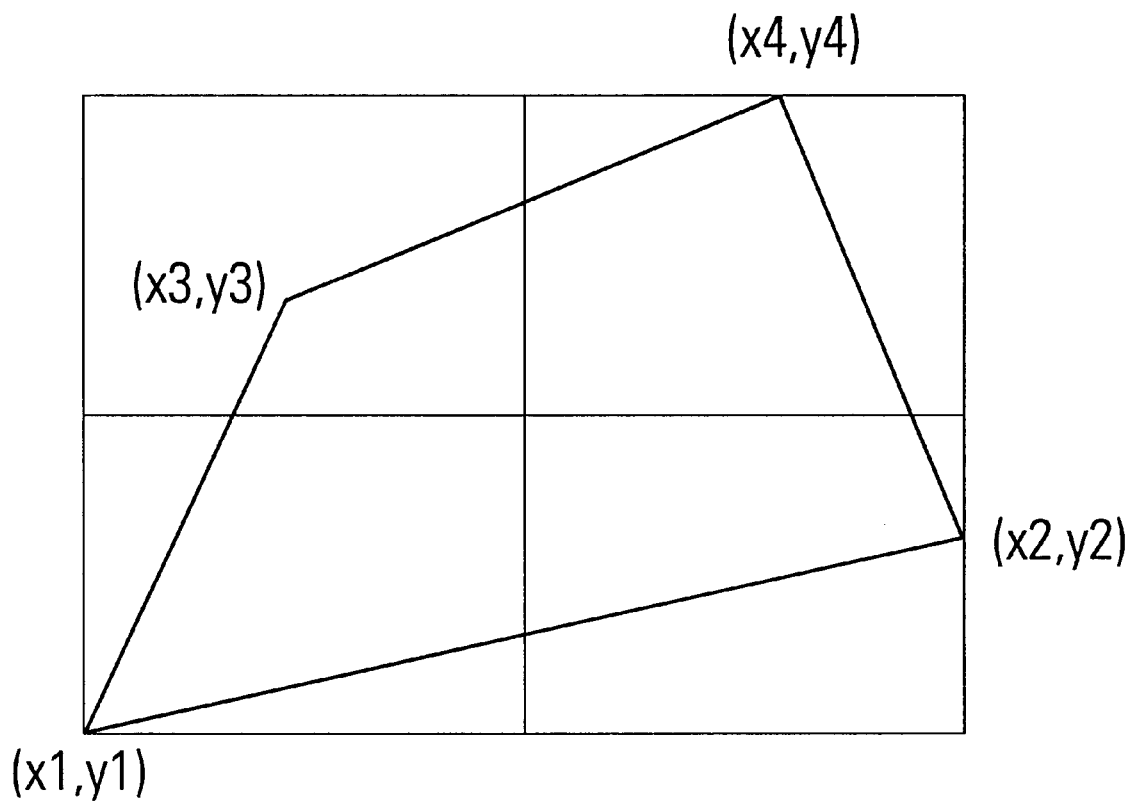
FIG. 2 is an example of a suitable triangulation and a corresponding min-max box (with tolerance) that may be constructed using the invention.

Some portions of the description that follows are presented in terms of procedures, logic blocks, processing and other symbolic representations of operations on information bits within a microprocessor. These descriptions and representations are the means used by those skilled in the data processing arts to most effectively convey the substance of their work to other skilled in the art. In the present application, a procedure, logic block, process or other symbolic representation is contemplated to be a self-consistent sequence of steps or instructions leading to a desired result. The steps are those requiring physical manipulations of values representing physical quantities. Often, these values take the form of electrical or magnetic signals that can be stored, transferred, logically combined, compared and otherwise manipulated in a computer system. It is convenient at times to refer to these signals as bits, bytes, elements, symbols, characters, terms, number and the like.

All of these terms and similar terms are to be associated with the corresponding physical quantities and are merely convenient labels associated with the physical quantities. Unless specifically stated otherwise, discussions that utilize terms such as "arranging," "comparing," "computing," "constructing," "determining," "estimating," "performing" and the like refer to actions and processes of a computer system or other similar electronic computing device, possibly used together with a device that receives, transmits, electronically filters or otherwise electromagnetically manipulates or transforms signals. The computer system or other similar electronic computing device manipulates and/or transforms information represented as electronic or similar quantities within the computer system's registers and memories into other information that is similarly represented as electronic or other quantities within the computer system registers, memories, information storage, display and transmission devices. The present invention is also suitable for use with other computer systems, such as optical, mechanical and biological computers.

Figure 1:
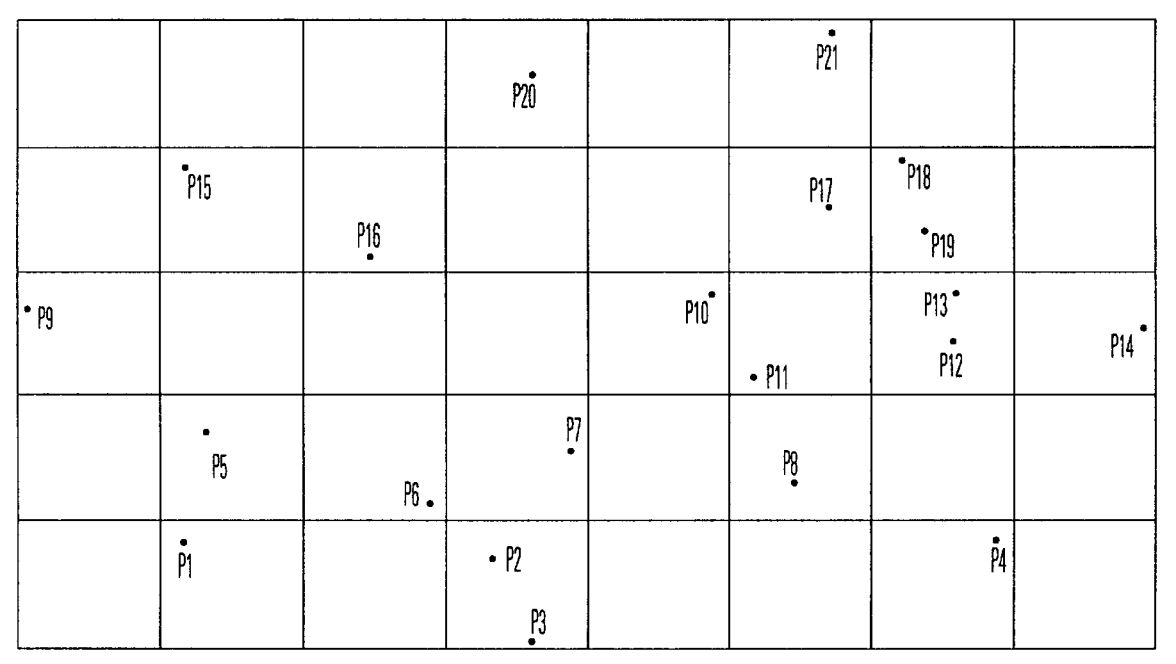

The procedure begins with an initial grid G1 of M1 uniform size rectangles or other selected polygons, imposed on a region R, as indicated in FIG. 1, where the region R preferably contains all points in a dataset P that is to be used as the basis for a triangulation of at least a portion of the region R. The initial grid G1 is usually defined without reference to, and without knowledge of, placement of the individual points in the dataset P.

The (finite) dataset P of distinct points in FIG. 1 with location coordinates $\{(x_i,y_i)\}$ (i=1, 2, ..., N) in a suitable coordinate system, within the region R and part of a (two-dimensional) surface $\Sigma$, as indicated in FIG. 1, is scanned into a computer. Strictly speaking, the coordinates for a given location form a triple $(x_i,y_i,z_i)$, with the third or z coordinate being determined on the surface S by a relation z=z(x,y). In practice, only the x- and y-coordinates are explicitly dealt with in conventional triangulation procedures.

The invention constructs a set of triangles in which (1) each vertex of each triangle is a point from the dataset P, (2) each point in the dataset P is a vertex of at least one triangle and (3) the triangle interiors are non-overlapping, as illustrated in an example in FIG. 2.

Let $(x_{m(x)}, y_{m(x)})$ be the location coordinates of a point in the dataset P with the minimum value of the first coordinate x, let $(x_{m(y)}, y_{m(y)})$ be the location coordinates of a point in P with the minimum value of the second coordinate y, let $(x_{m^*(x)}, y_{m^*(x)})$ be the location coordinates of a point in P with the maximum value of the first coordinate x, let $(x_{m^*(y)}, y_{m^*(y)})$ be the location coordinates of a point in the dataset P with the maximum value of the second coordinate y, and define $$x_{min} = x_{m(x)}, \tag{1A}$$

$$y_{min} = y_{m(y)}, \tag{1B}$$

$$x_{max} = x_{m^*(x)}, \tag{1C}$$

$$y_{max} = y_{m^*(y)}. \tag{1D}$$

A small positive number TOL is then selected, and a rectangle R(TOL), defined by $\{(x,y)|x_{min}-\text{TOL} \leq x \leq x_{max}+\text{TOL}, y_{min}-\text{TOL} \leq y \leq y_{max}+\text{TOL}\}$ is then constructed, called the min-max box (with tolerance). The corresponding rectangle R(TOL=0) includes all points in the dataset P, but the slightly larger rectangle R(TOL) is used to resolve conflicts when a triangle lies on a boundary line of the min-max box.

Within the min-max box, a rectangular grid G1 may be defined by a GridSize parameter, defined by $$\text{GridSize1} = \{(x_{max}-x_{min})(y_{max}-y_{min})/N\}^{1/2}, \tag{2}$$

and by a location, such as (x0−TOL,y0−TOL), for one grid intersection. Two new parameters, $$X(\text{resolution}) = [(x_{max}-x_{min})/\text{GridSize1}]_{int}+1, \tag{3}$$

$$Y(\text{resolution}) = [(y_{max}-y_{min})/\text{GridSize1}]_{int}+1, \tag{4}$$

are then computed and used in the procedure, where $[w]_{int}$ is the integer part of the real number w, the largest integer that is less than or equal to w. For example $[5.85]_{int}=5$ and $[-3.7]_{int}=-4$.

With the initial grid G1 chosen, the dataset P of points within a sequence C1 of rectangular cells defined by G1 is examined. A certain number M($\phi$) cells in the cell sequence C1 will be found to be empty. The subset M($\phi$) of empty cells in G1 is removed, leaving a second subset of M'=M1−M($\phi$)(1$\leq$M'$\leq$M1) in a reduced cell array C'. A new grid size parameter, defined by $$\text{GridSize2} = \text{GridSize1}\{M'/N\}^{1/2}, \tag{5}$$

is then computed, where M' is the number of non-empty cells. Optionally, GridSize2 can be divided by a number, GridSizeDiv, that lies in the approximate range 1.10$\leq$GridSizeDiv$\leq$2.5, in order to reduce the time required for the subsequent computations. The number GridSizeDiv actually used here can be optimized by further testing on classes of datasets P of points used to describe or approximate the surface S. A second grid G2 and corresponding rectangular cell array C2 are constructed, using Eqs. (3) and (4). The grid C2 includes a sequence of horizontally oriented rows of rectangular cells from the array C2, where any two adjacent rows of cells overlap only their common boundary and two non-adjacent rows do not overlap. This is illustrated in FIG. 1 with an array C2 of seven rows of ten rectangular cells each, with a total of N=38 points {Pi} with coordinates (xi,yi) (i=1, 2, ..., 38) in the dataset P.

Two points Pi and Pj are said to be "coincident" if the Euclidean distance d(Pi,Pj) between these two points is less than a (small) selected non-negative number CTOL. In some instances, the number CTOL may be selected to be zero. In most instances, the number CTOL is positive and may depend upon the application and upon the number TOL introduced above. If coincident points are found, such points are removed.

Within each cell c in the array C2, the non-coincident location coordinate pairs (xi,yi) representing points in the dataset P within that cell are arranged in a linear sequence L(C2)={(x'i,y'i)|(x'i,y'i) in P}, which is defined as follows. If (x'i,y'i) and (x'j,y'j) are both members of L(C2) in the same row, with i<j, then either $$x'i < x'j \text{ or} \tag{6A}$$

$$x'i = x'j \text{ and } y'i < y'j. \tag{6B}$$

Consider three (non-coincident) points Pa, Pb and Pc in the dataset P, with xa<xb<xc. The two edges Pa-Pb and Pc-Pb have a common point, Pb, with a clockwise-measured angle A(a,b,c). The clockwise angle A(a,b,c) is said to satisfy the Acute Angle Test if the value of this angle satisfies $$A(a,b,c) \leq A_{thr} = 90°. \tag{7}$$

The angle A(a,b,c) does not satisfy the Acute Angle Test if the value of this angle is greater than 90°. The threshold angle, $A_{thr}=90°$, used for the Acute Angle Test can be replaced by some a selected larger angle, such as 153°27', for which the cotangent is −2.

A candidate triangle TR(a,b,c) that tentatively belongs to the dataset P may be deleted from P if this triangle does not satisfy the Acute Anbgle Test. Alternatively and preferably, a candidate triangle TR(a,b,c) that satisfies all other criteria for membership in the dataset P may be added to P if this triangle satisfies the Acute Angle Test.

The triangle TR(a,b,c) defined by the three points Pa, Pb, Pc with xa<xb<xc is said to be a "thin vertical triangle" if $$\text{Height}\{TR(a,b,c)\}=\max\{|ya-yb|, |yb-yc|, |yc-ya|\} > TVTP \cdot \text{Width}\{TR(a,b,c)\} = TVTP \cdot (xc-xa), \tag{8}$$

where TVTP (thin vertical triangle proportion) is a selected, positive value parameter. In practice, the parameter TVTP may be selected to have any value greater than 1.0, but TVTP≧3.0 is preferred. In the example shown in FIGS. 3–44, TVTP=3.0 is selected. If the triangle TR(a,b,c) is not a thin vertical triangle, the triangle is said to satisfy the Thin Vertical Triangle Test; that is, such a triangle is not a "thin vertical triangle" as defined herein.

Consider four points Pa, Pb, Pc and Pd with xa≦xc<xd<xb, with Pc and Pd being in the same row. Consider the triangle TR(a,b,c), with the vertices a,b,c being designated in clockwise order. The point Pd and the vertices of the triangle TR(a,b,c) are said to satisfy an "Internal Angle Test" if the indicated clockwise angle value satisfies the condition $$A(c,b,a) \geq A(c,d,a). \tag{9}$$

Where this Internal Angle Test is applied and the internal angle constraint (Eq. (9)) is satisfied, the triangle TR(a,b,c) is tentatively added to the triangulation model. Where the Internal Angle Test (Eq. (9)) is not satisfied, two other triangles, TR(a,b,d) and TR(a,c,d), are tentatively added to the triangulation model. Tests associated with the Acute Angle Test, the Thin Vertical Triangle Test and the Internal Angle Test are applied many times in the following development of a triangulation model.

The Internal Angle Test, embodied in Eq. (9), is applied to a new point, if the starting point of the current edge belongs to the same row as the new point, using this new point as a triangle vertex, to determine whether a candidate triangle including the new point is tentatively added to the model.

If a difference in number of rows between the present new point and the current new edge exceeds a selected positive integer $N_{thr} \geq 2$, preferably $N_{thr} \geq 4$, an additional test, referred to as the "good enough" test, is performed on a current edge combined with each of two adjacent edges. If the angle A(a,b,c) formed at each end (b) of the current edge satisfies $$A(a,b,c) \leq A_{thr}, \tag{10}$$

where $A_{thr}$ is a selected threshold angle that may be larger than 90° (e.g., $A_{thr}$=153°27'), the new point b satisfies the "good enough" test.

A row may contain no point, one point or more than one point in the dataset P. The first row contains at least one point in the dataset P, or the row would be deleted. Assume that the first row contains N1 points from P (1≦N1<N), numbered n=1, ..., N1 and assume that row number m contains Nm−N(m−1) points from P (2≦m≦M), where M is the number of (horizontal) rows in the cell array C2.

In the example shown in FIG. 1, N=5, N2=10, N3=20, N4=25, N5=27, N6=32, N7=38 and M=7 for the dataset P. FIGS. 3–44 refer to the procedure of triangulation of the dataset P shown in FIG. 1.

A top list of edges and a bottom list of edges are constructed as follows. Beginning with the point P1 in row 1, let Pi be the "first" point after P1 in the ordered dataset P={P1, P2, P3, ..., PN} for which x1≠xi. If xi<x1 (which requires that yi>y1) with i=2, form the edge Pi-P1 (i.e., P2-P1) and add this to the top list and add P1-Pi to the bottom list. If xi<x1 with i≧3, form the edge Pi-P(i−1) and add this to the top list, and add P(i−1)-P(i−2)- ... -P1-Pi to the bottom list. If xi>x1 and i=2, form the edge P1-Pi (i.e., P1-P2) and add this to the top list, and add Pi-P1 to the bottom list. If xi>x1 and i≧3, form the edge P(i−1)-Pi and add this to the top list, and add Pi-P1-P2- ... P(i−1) to the bottom list. If two points Pa and Pb appear in the top list, xa≠xb; if xa=xb and ya<yb, only the point Pb appears in the top list. This requirement is not imposed on the bottom list.

Figure 3:
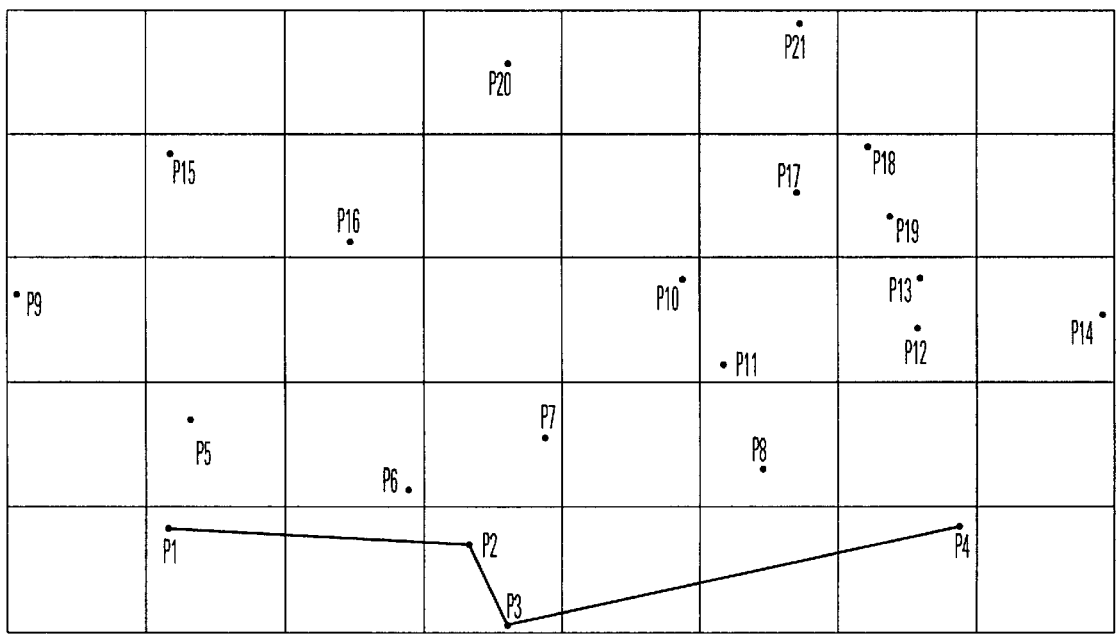

In FIG. 3, x1=x2 and xi=x3. The top list thus far includes the edge endpoints P2-P3 and the bottom list thus far includes the edge endpoints P3-P1-P2. The triangle TR(1, 2,3) is formed is found to satisfy the Thin Vertical Triangle Test. The triangle TR(1,2,3) is tentatively added to a set TRM of triangles that will form the basis of the triangulation model for the dataset P according to the invention.

In FIG. 4, the value of the included angle A(3,4,5) is greater than $A_{thr}$ so that the triangle TR(3,4,5) is not added to the set TRM. The top list now includes P2-P3-P4-P5 and the bottom list now includes P5-P4-P3-P1-P2.

Figure 5:
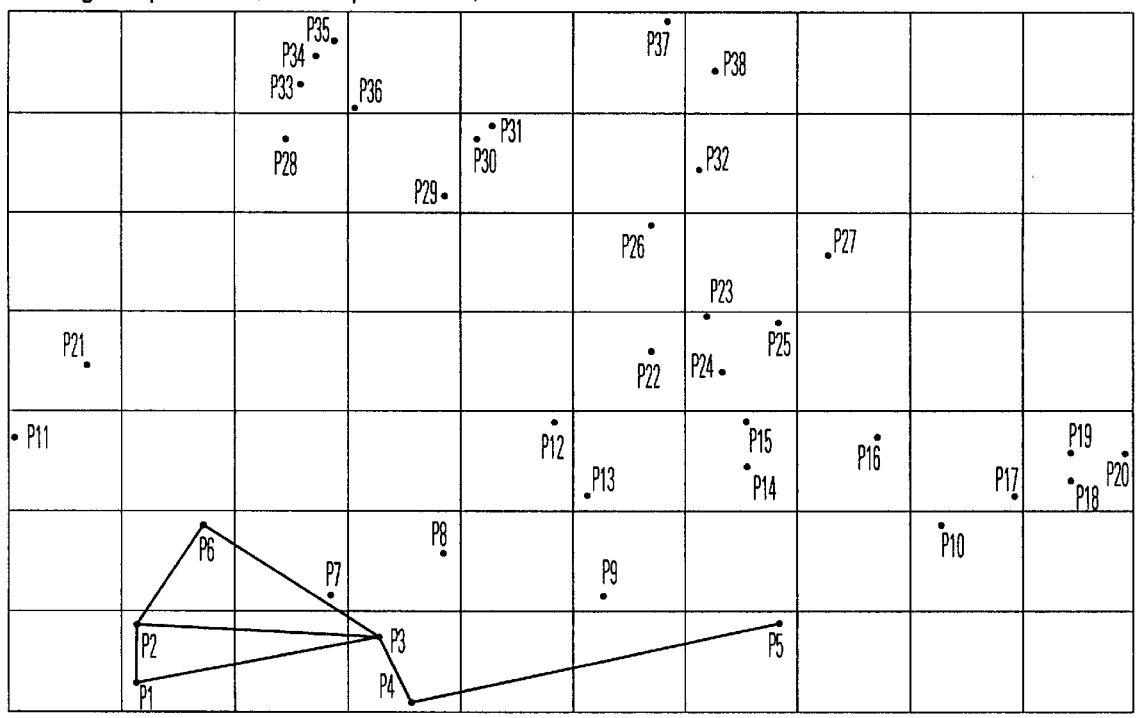

In FIG. 5, the first point P6 is added from row number 2, and the current edge is P2-P3. The triangle TR(2,3,6) is constructed. This triangle satisfies the Thin Vertical Triangle Test and is tentatively added to the model. The top list now includes P2-P6-P3-P4-P5, and the bottom list remains the same: P5-P4-P3-P1-P2.

Figure 6:
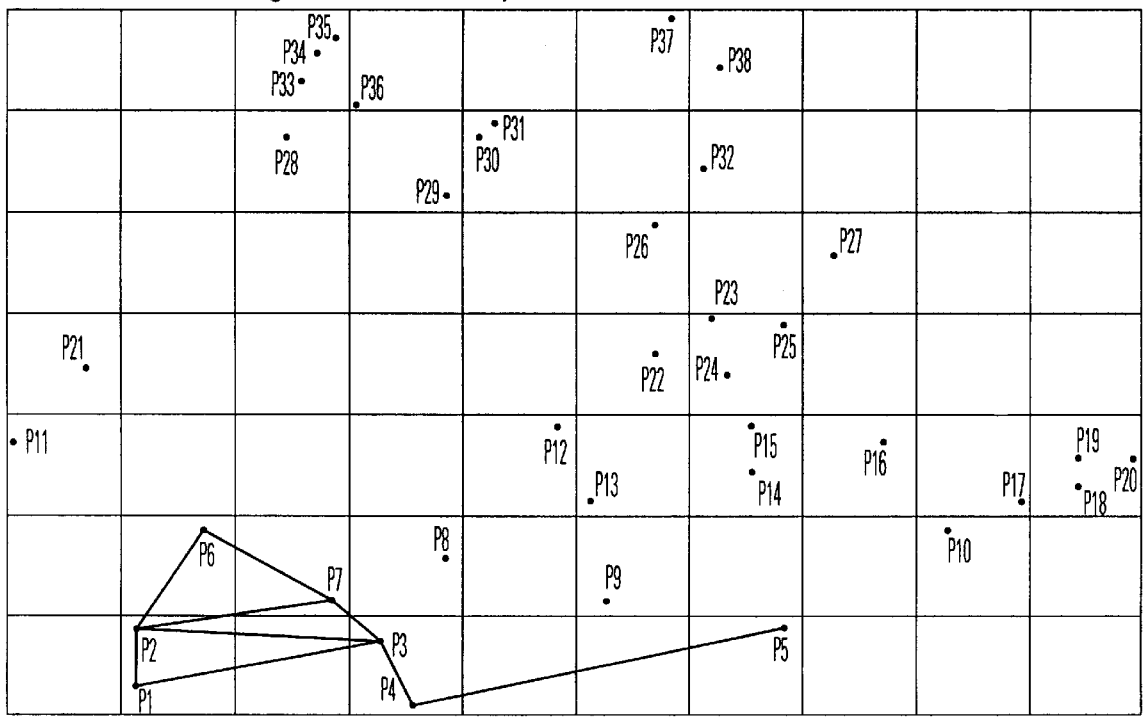

When a new point P7 is introduced, in FIG. 6, this new point in combination with the triangle TR(2,3,6) is found not to satisfy the Internal Angle Test. The triangle TR(2,3,6) is deleted from the model and is replaced by two new triangles, TR(2,3,7) and TR(2,6,7), which are tentatively added to the model. The top list now includes P2-P6-P7-P3-P4-P5, and the bottom list remains the same.

Figure 7:
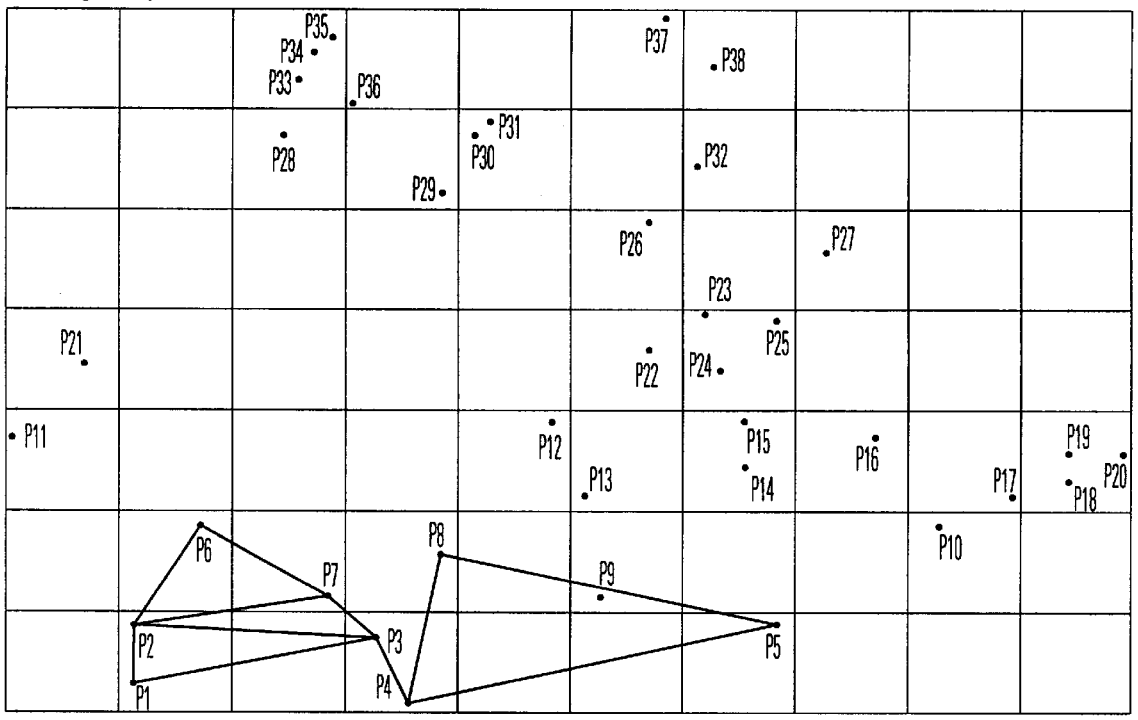

In FIG. 7, a triangle TR(4,5,8) is constructed, is found to satisfy the Thin Vertical Triangle Test and is tentatively added to the model. The top list now includes P2-P6-P7-P3-P4-P8-P5, and the bottom list remains the same.

Figure 8:
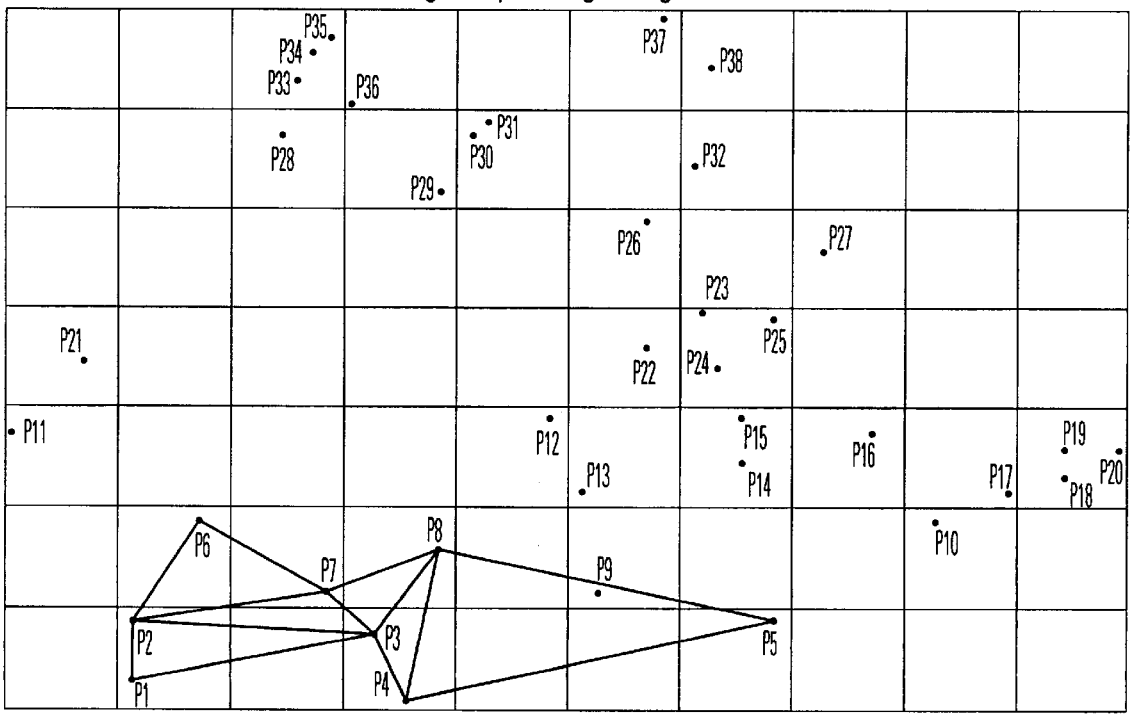

In FIG. 8, the Acute Angle Test is applied to the intersecting edges P3-P4 and P4-P8, and a triangle TR(3,4,8) is constructed and tentatively added to the model. The Acute Angle Test is then applied to the intersecting edges P7-P3 and P3-P8, and a triangle TR(3,7,8) is constructed and added to the model.

Figure 9:
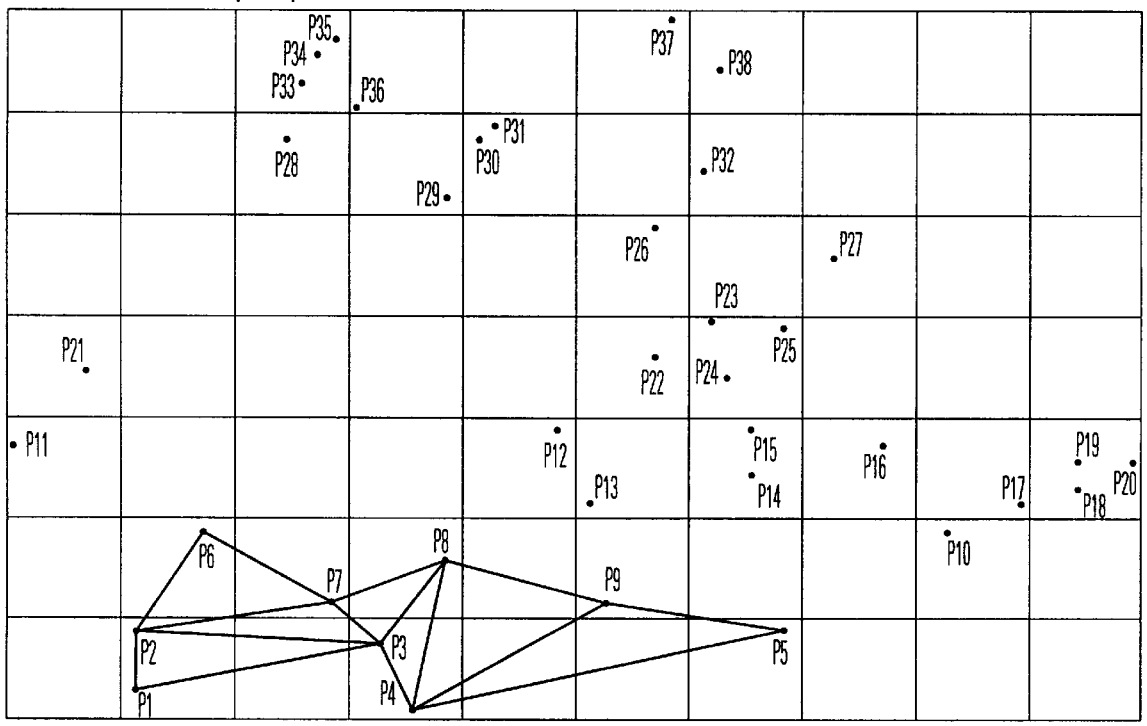

When a new point P9 is introduced, in FIG. 9, this new point in combination with the triangle TR(4,5,8) is found not to satisfy the Internal Angle Test. Thus, the triangle TR(4,5,8) is deleted from the model and is replaced by two triangles, TR(4,5,9) and TR(4,8,9) are tentatively added to the model. The top list now includes P2-P6-P7-P8-P9-P5, and the bottom list remains the same.

Figure 10:
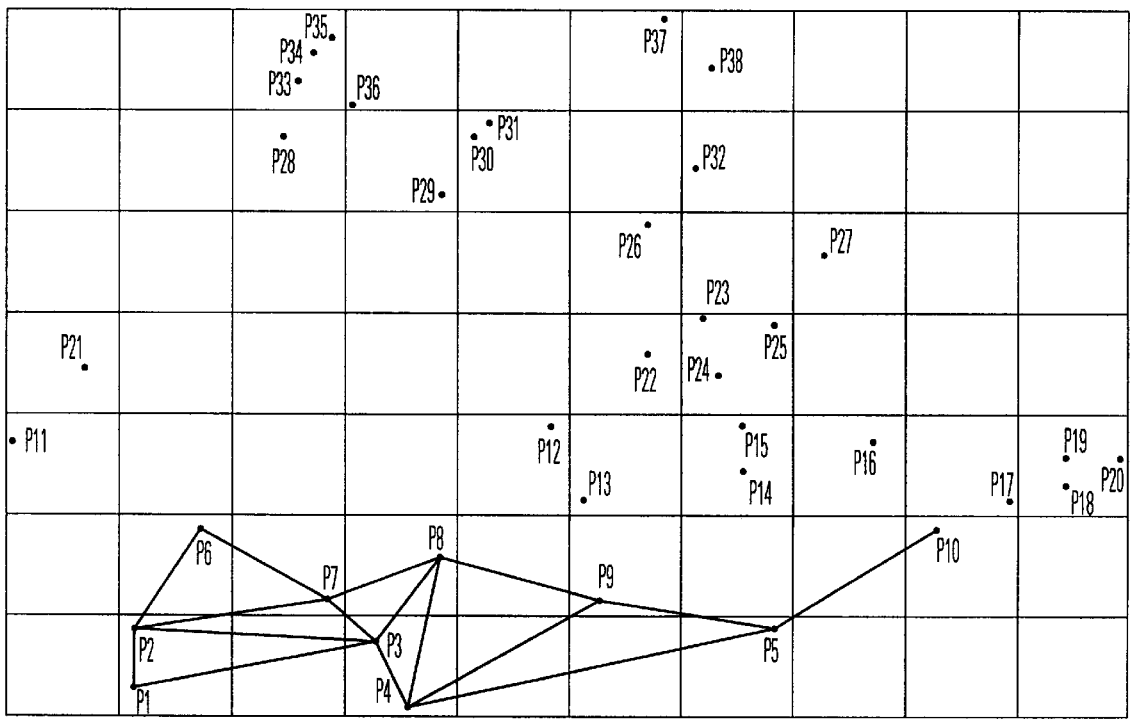
Figure 11:
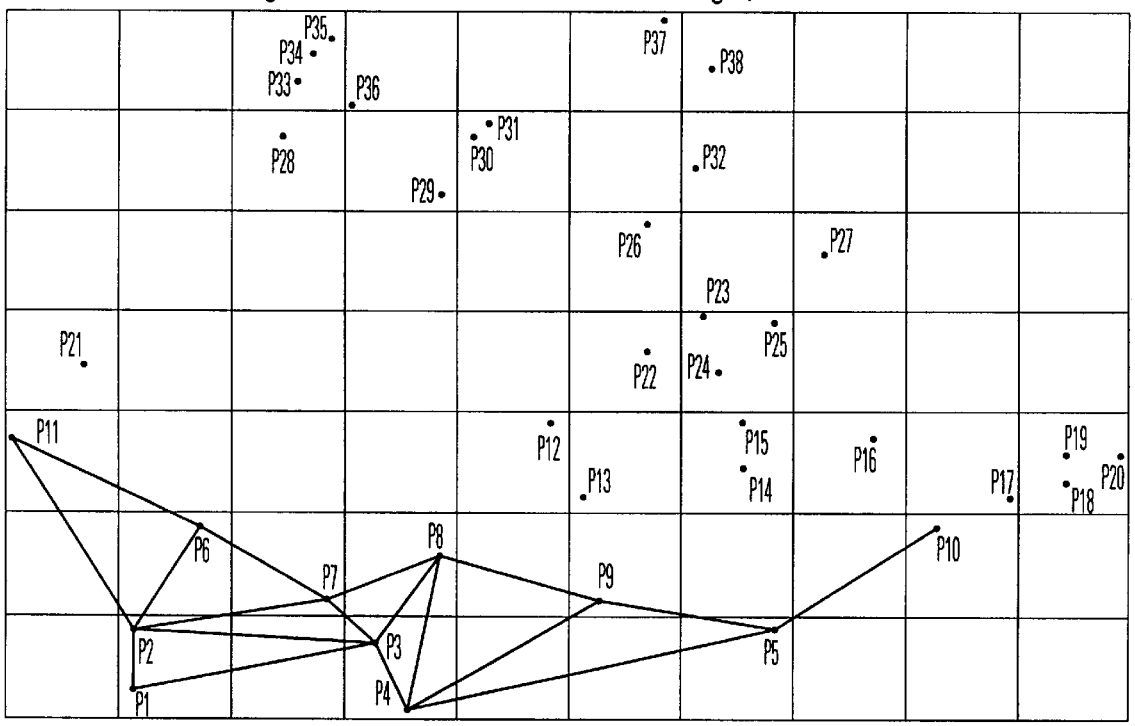

In FIG. 10, a new line segment from P5 to a new point P10 is added. No new triangle, such as TR(5,9,10), is added, because this triangle fails the Acute Angle Test. In FIG. 11, a new point P11 is added. A new line P2-P11 is added, and the edges P11-P2 and P2-P6 are found to satisfy the Acute Angle Test. The triangle TR(2,6,11) is constructed and tentatively added to the model. The top list now includes P1-P6-P7-P8-P9-P5-P10, and the bottom list now includes P10--P5-P4-P3-P1-P2-P11.

Figure 12:
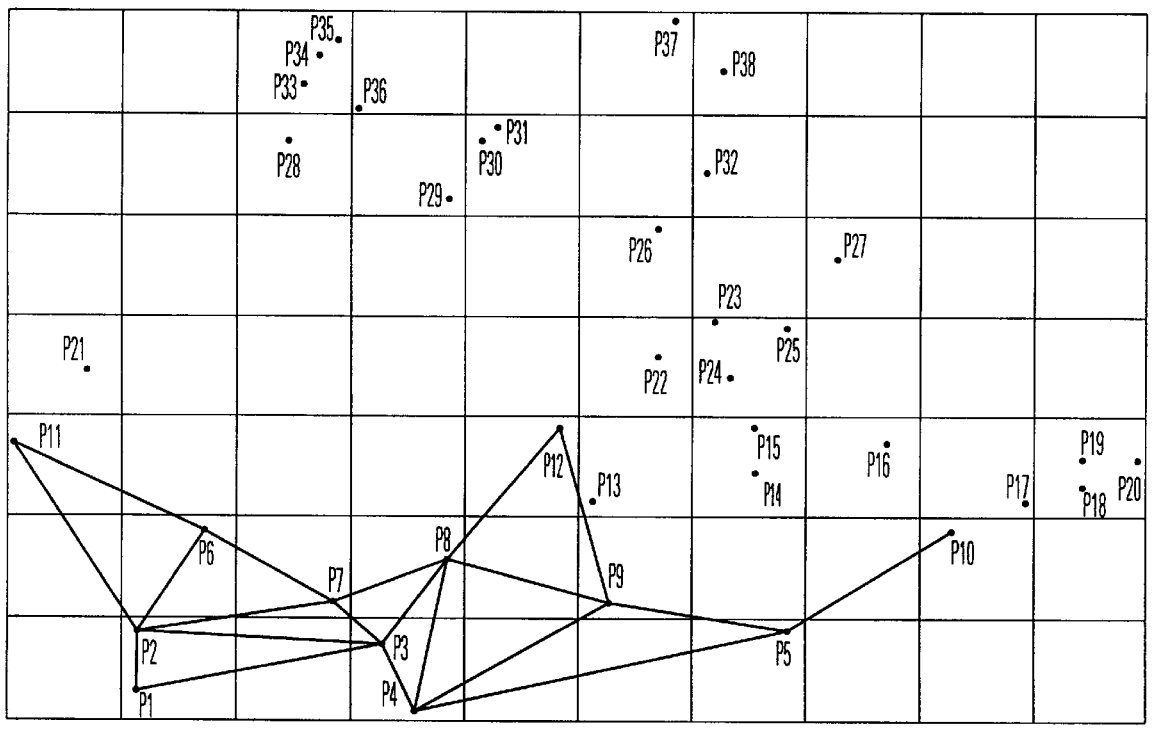
Figure 13:
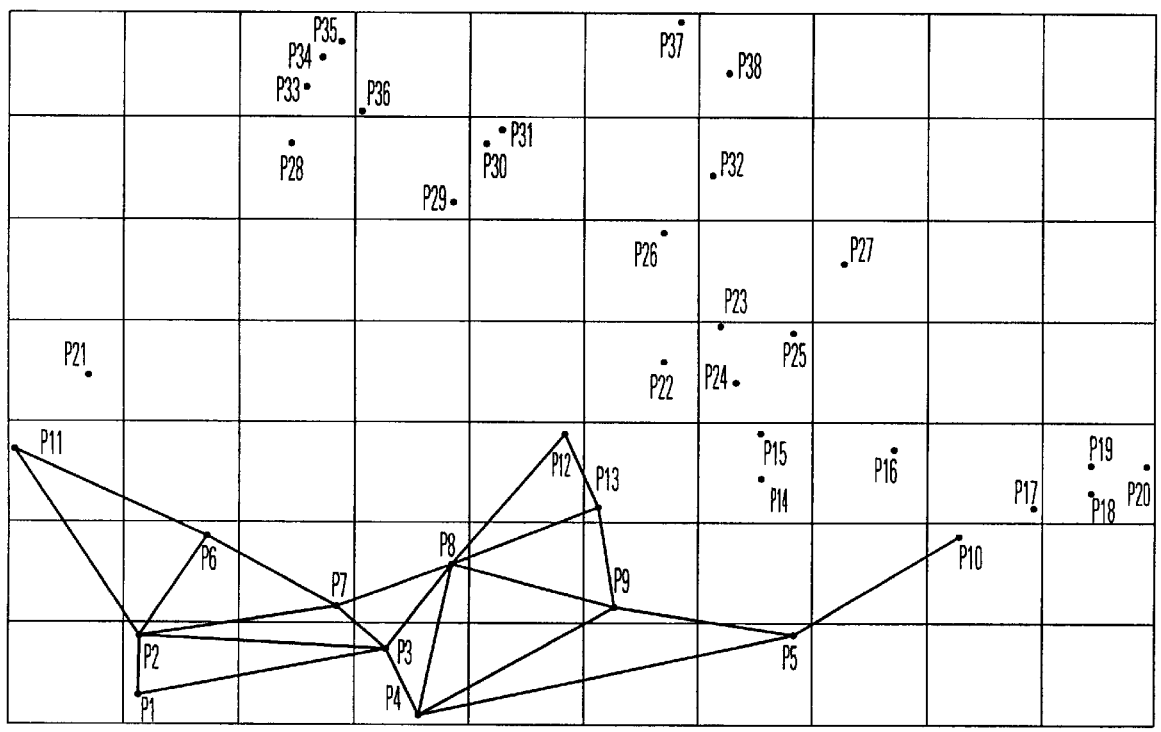

In FIG. 12, a new point P12 is added, and a new triangle TR(8,9,12) is constructed, found to satisfy the Thin Vertical Triangle Test, and tentatively added to the model. With reference to FIG. 13, the new point P13 and the triangle TR(8,9,12) do not satisfy the Internal Angle Test. Thus, the triangle TR(8,9,12) is deleted and is replaced by the two triangles TR(8,9,13) and TR(8,12,13), which individually satisfy the Thin Vertical Triangle Test and are tentatively added to the model. The top list is now P11-P6-P7-P8-P12-P13-P9-P5-P10, and the bottom list remains the same.

Figure 14:
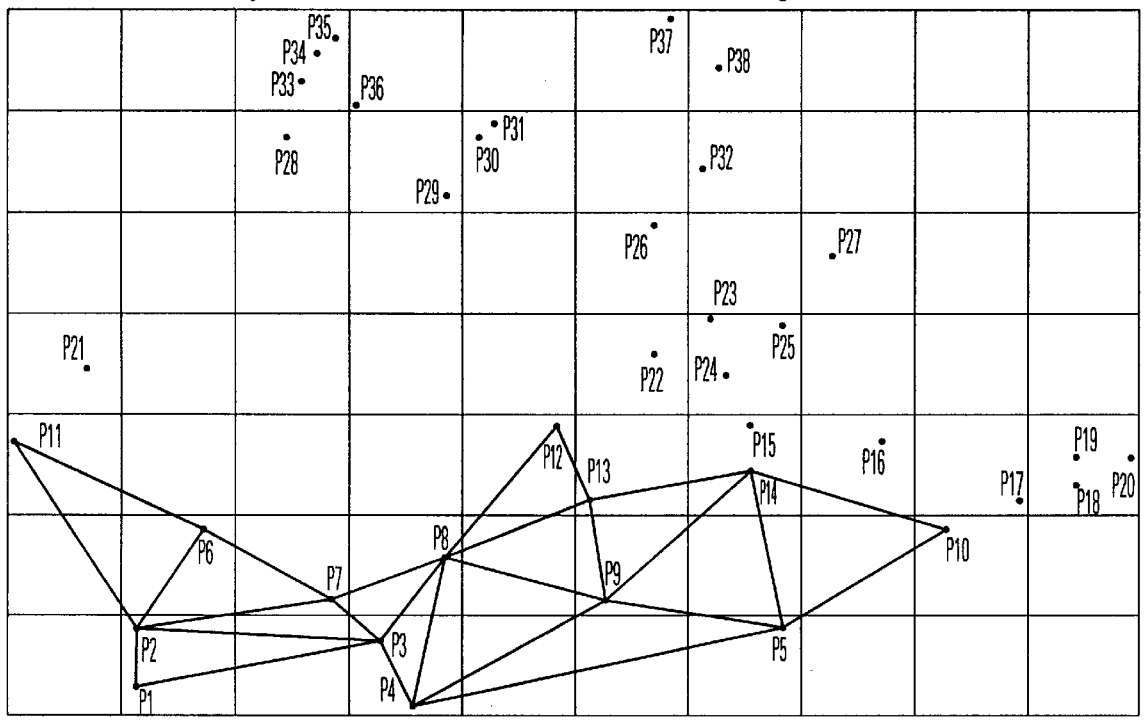

A new point P14 is added in FIG. 14. A new triangle TR(5,9,14) is constructed, found to satisfy the Thin Vertical Triangle Test, and tentatively added to the model. The edges P13-P9 and P9-P14 satisfy the Acute Angle Test, and the triangle TR(9,13,14) is constructed and tentatively added to the model. The edges P14-P5 and P5-P10 satisfy the Acute Angle Test, and the triangle TR(5,10,14) is constructed and added to the model.

Figure 15:
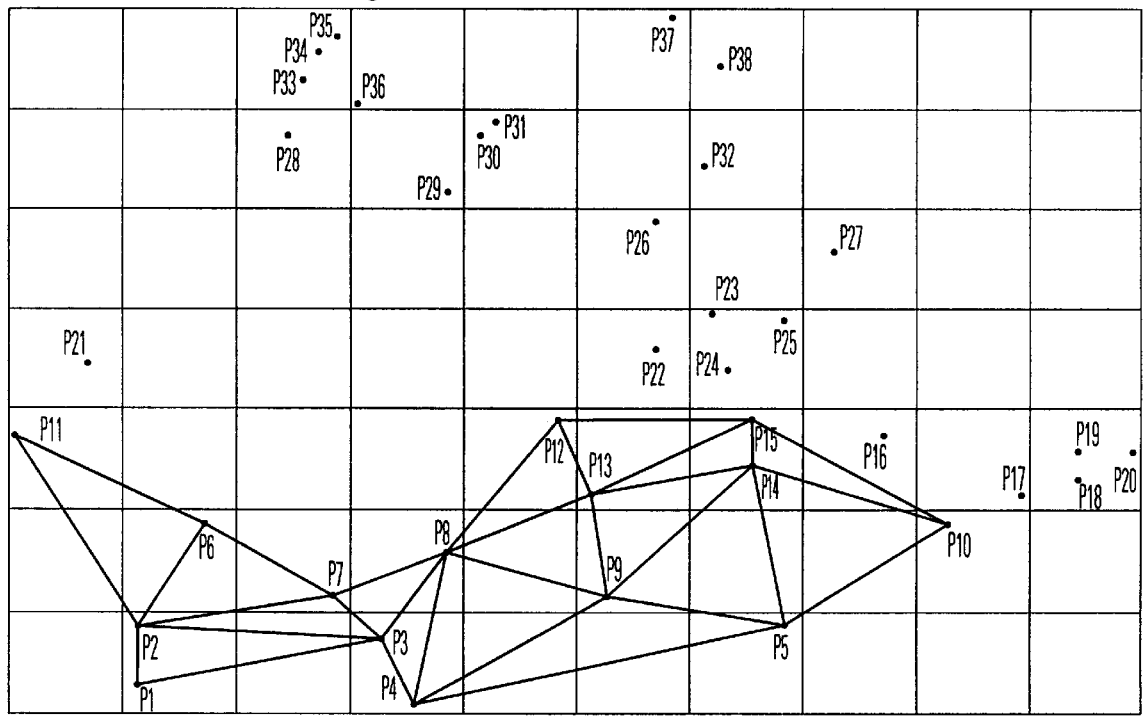

In FIG. 15, the point P15 is added. Three new triangles, TR(10,14,15), TR(12,13,15) and TR(13,14,15) are constructed, found to individually satisfy the Thin Vertical Triangle Test, and tentatively added to the model. The top list is now P11-P6-P7-P8-P12-P15-P10, and the bottom list remains the same.

Figure 16:
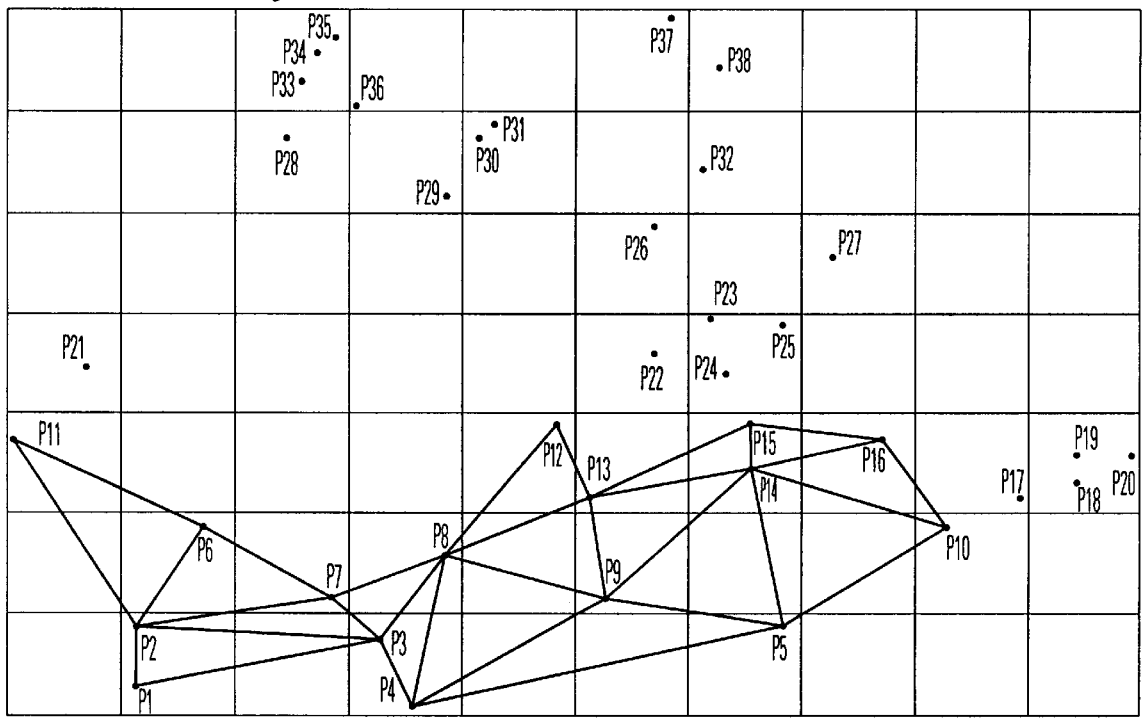

In FIG. 16, a new point P16 is added. The point P16 and the candidate triangle TR(14,10,15) do not satisfy the Internal Angle Test so that the triangle TR(14,10,15) is replaced by the triangles TR(14,15,16) and TR(10,14,16), which are tentatively added to the model.

Figure 17:
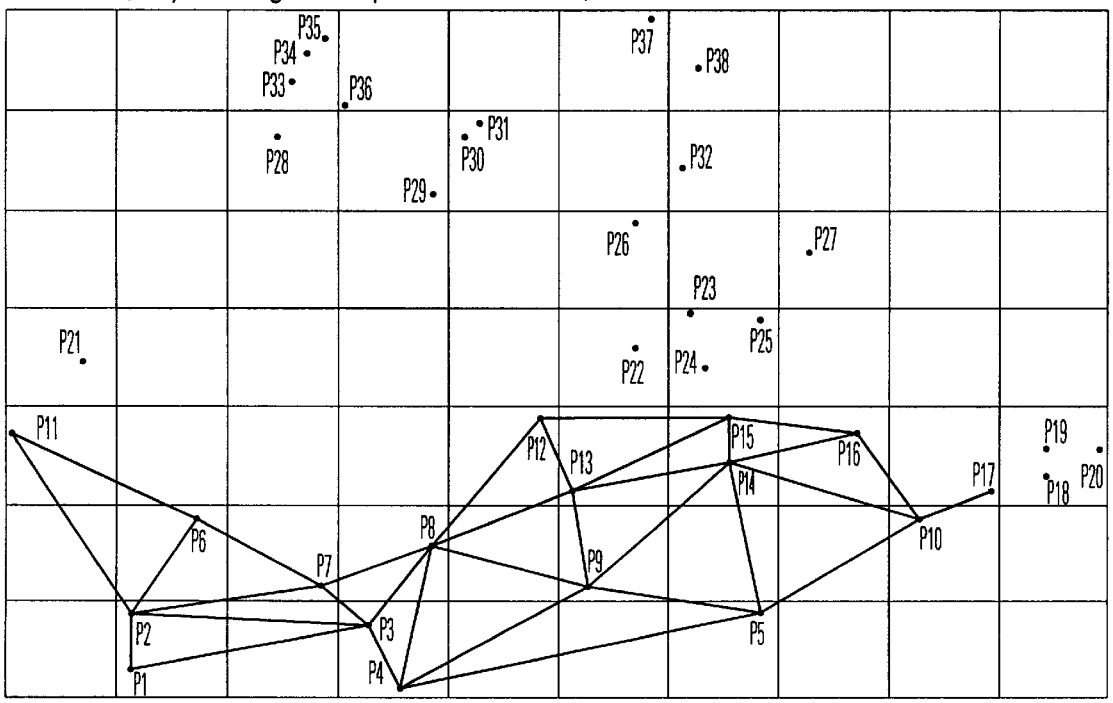

In FIG. 17, a new point P17 is added. A candidate triangle, TR(10,16,17), does not satisfy the Acute Angle Test and is not added to the model. The top list is now P11-P6-P7-P8-P12-P15-P16-P10-P17, and the bottom list becomes P17-P10-P5-P4-P3-P1-P2-P11.

Figure 18:
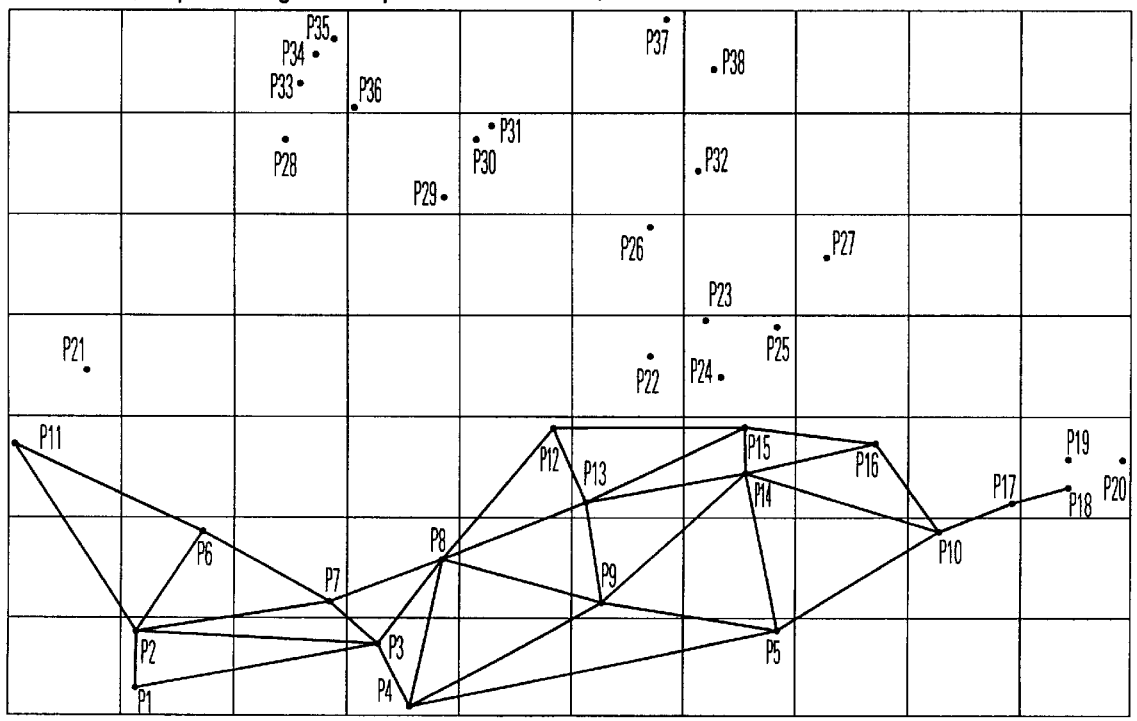
Figure 19:
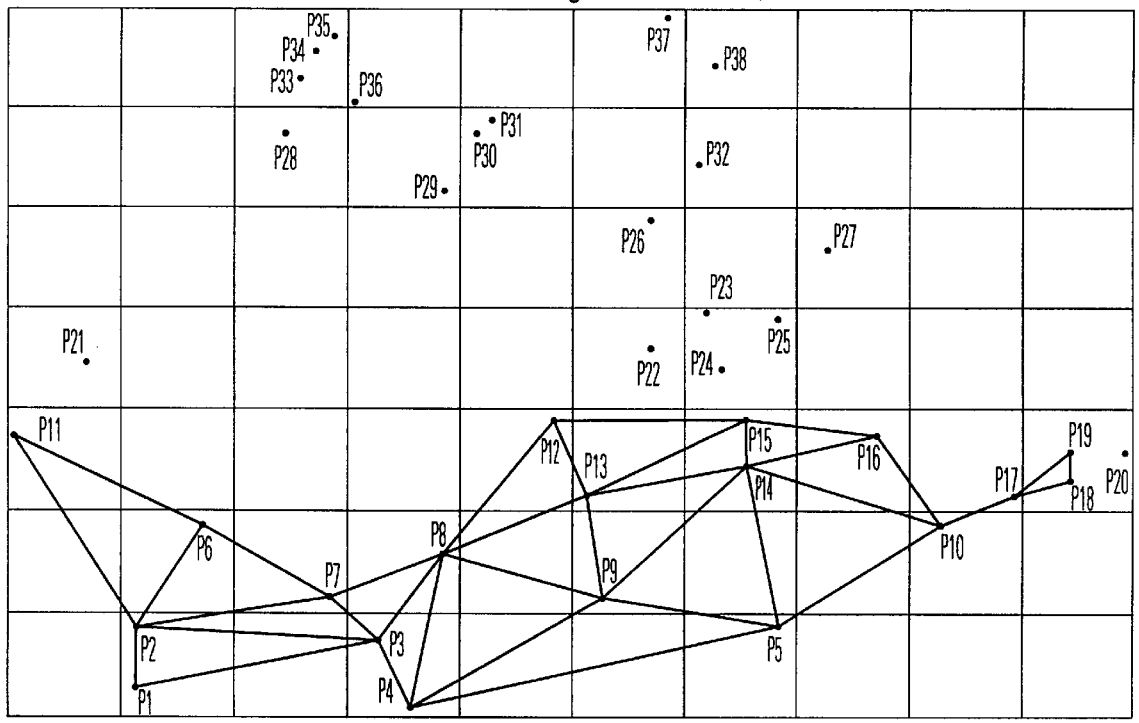

A new point P18 is added in FIG. 18. A candidate triangle, TR(10,17,18), does not satisfy the Acute Angle Test and is not added to the model. In FIG. 19, a new point P19 is added, and a new triangle TR(17,18,19) is constructed and tentatively added to the model, because the x coordinates satisfy x18=x19. The top list is now P11-P6-P7-P8-P12-P15-P16-P10-P17-P19, and the bottom list becomes P19-P18-P17-P10-P5-P4-P3-P1-P2-P11.

Figure 20:
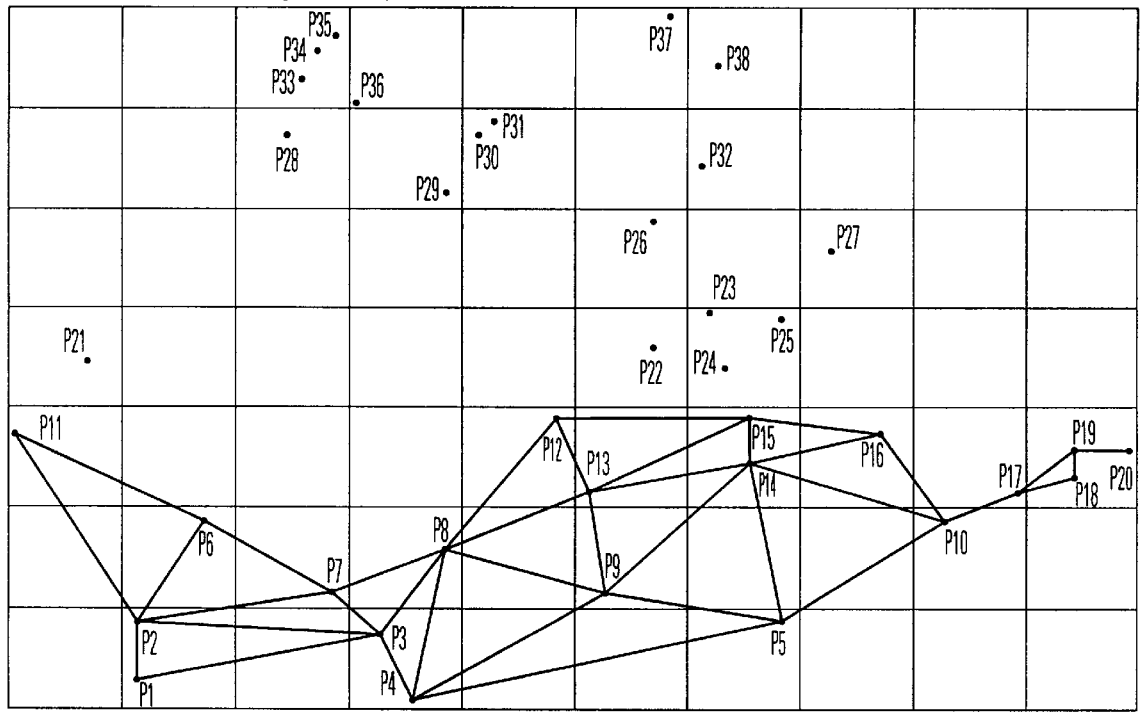
Figure 21:
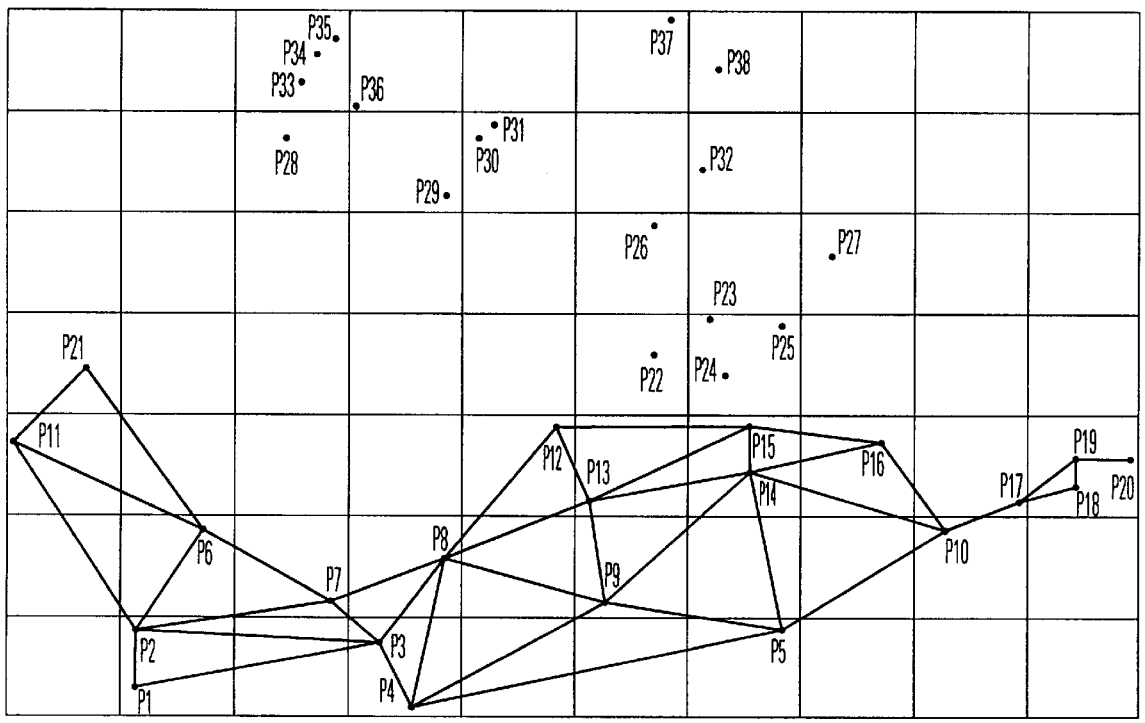

In FIG. 20, a new point P20 is added. A candidate triangle, TR(18,19,20) does not satisfy the Acute Angle Test and is not added to the model. A new point P21 is added in FIG. 21. A new triangle TR(6,11,21) is constructed, found to satisfy the Thin Vertical Triangle Test, and tentatively added to the model. The top list becomes P11-P21-P6-P7-P8-P12-P15-P16-P10-P17-Pl9-P20, and the bottom list becomes P20-P19-P18-P17-P10-P5-P4-P3-P1-P2-P11.

Figure 22:
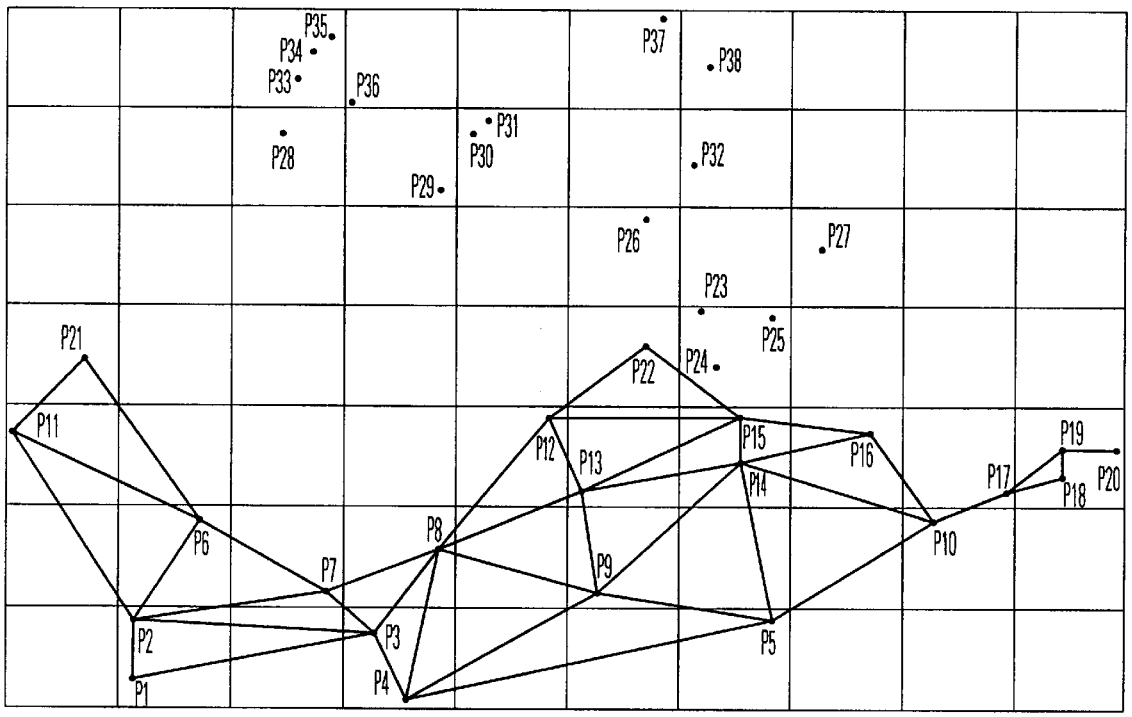
Figure 23:
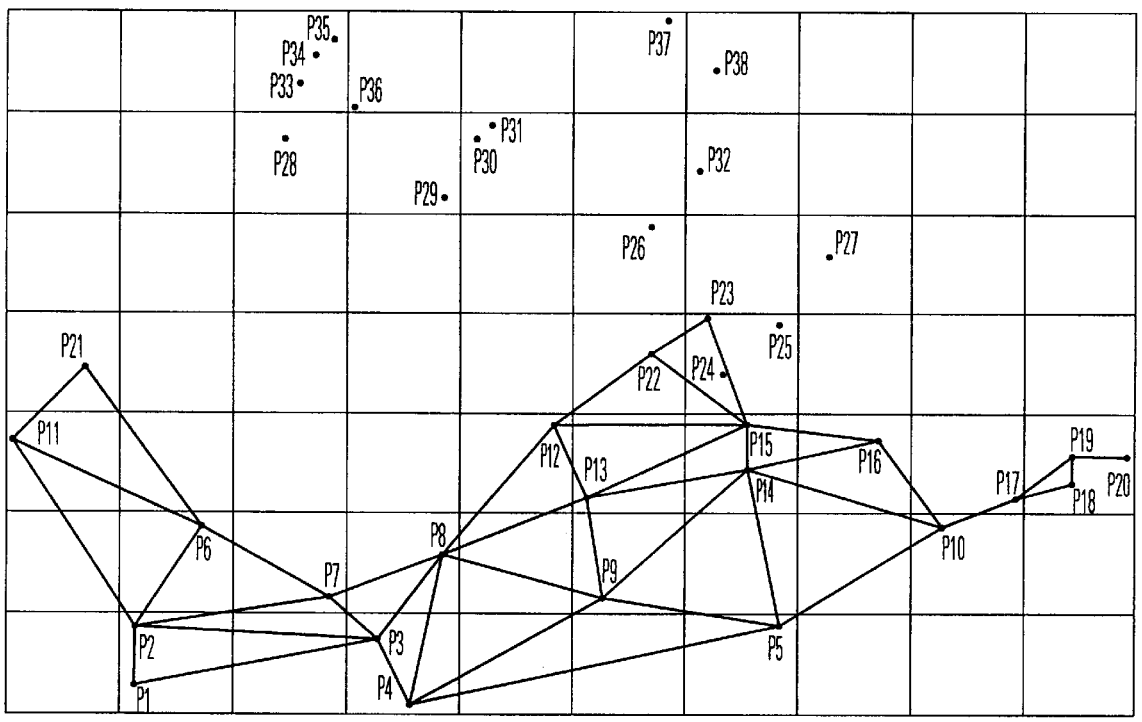

A new point P22 is added in FIG. 22. A new triangle TR(12,15,22) is constructed, found to satisfy the Thin Vertical Triangle Test, and tentatively added to the model. In FIG. 23, a new point P23 is added. A new triangle TR(15,22,23) is constructed, found to satisfy the Thin Vertical Triangle Test, and tentatively added to the model. A candidate triangle TR(12,22,23) doesn't satisfy the Acute Angle Test and is not added to the model. The top list is now P11-P21-P6-P7-P8-P12-P22-P23-P15-P16-P10-P17-P19-P20, and the bottom list remains the same.

Figure 24:
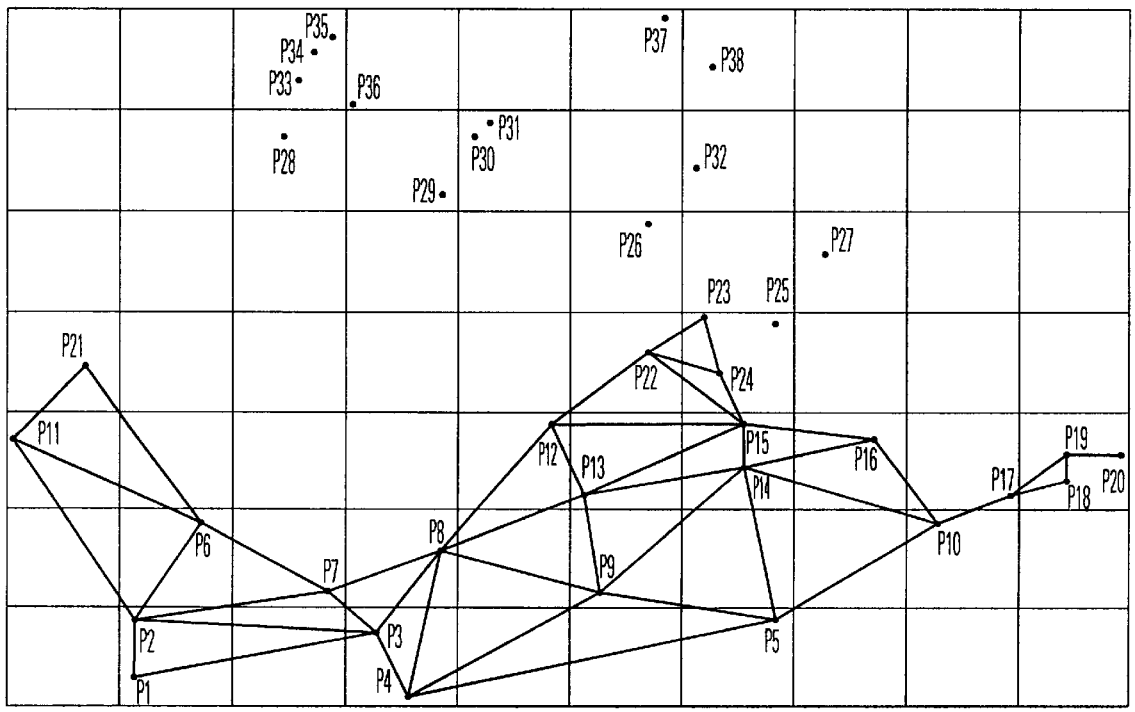

In FIG. 24, a new point P24 is added. The new point P24, in combination with the triangle TR(15,22,23), does not satisfy the Internal Angle Test. The triangle TR(15,22,23) is, therefore, deleted from the model and is replaced by two new triangles, TR(15,22,24) and TR(22,23,24). The top list is now P11-P21-P6-P7-P8-P12-P22-P23-P24-P15-P16-P10-P17-P19-P20, and the bottom list remains the same.

Figure 25:
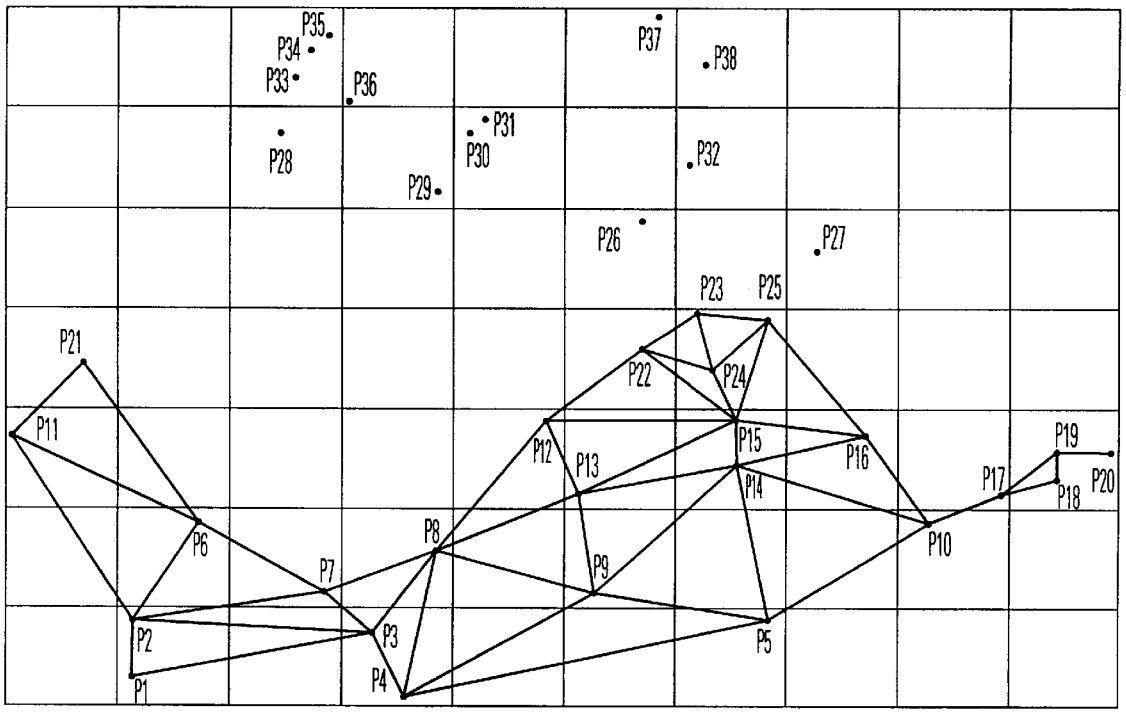

A new point P25 is added in FIG. 25. An Acute Angle Test is applied, and triangles TR(15,16,25), TR(15,24,25) and TR(23,24,25) are constructed and tentatively added to the model. The top list now includes P11-P21-P6-P7-P8-P12-P22-P23-P25-P15-P16-P10-P17-P19-P20, and the bottom list remains the same.

Figure 26:
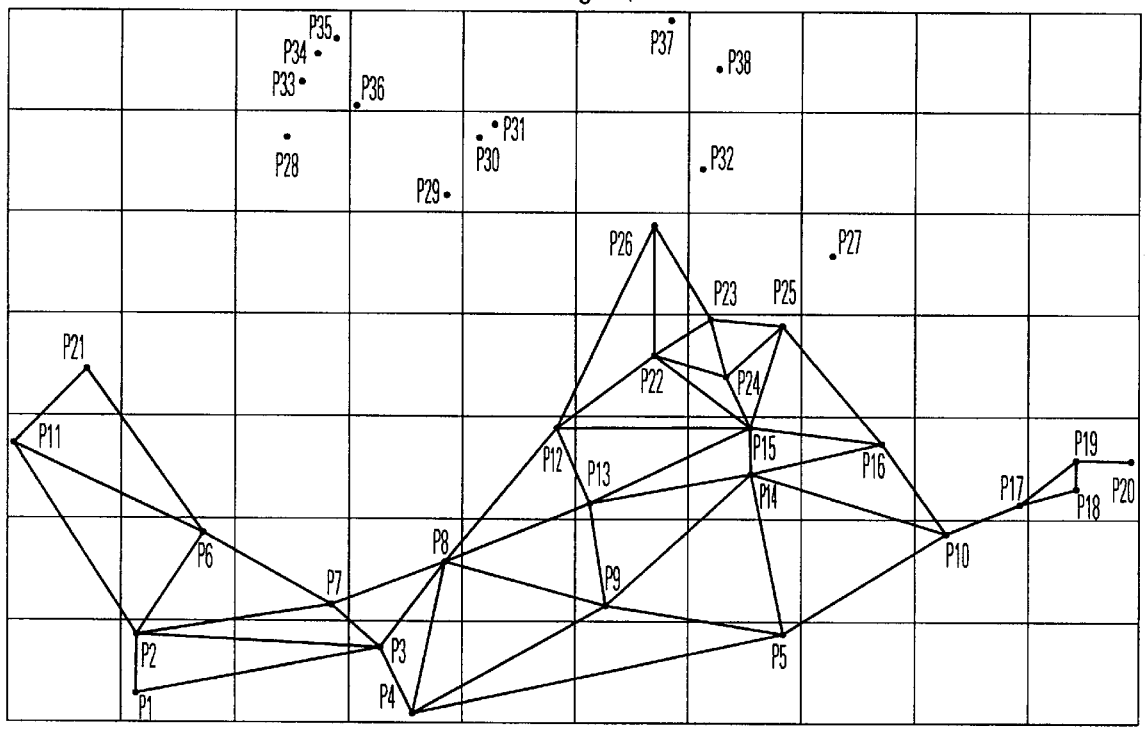

A new point P26 is added in FIG. 26. Two new triangles, TR(12,22,26) and TR(22,23,26), are constructed, found to individually satisfy the Thin Vertical Triangle Test, and tentatively added to the model.

Figure 27:
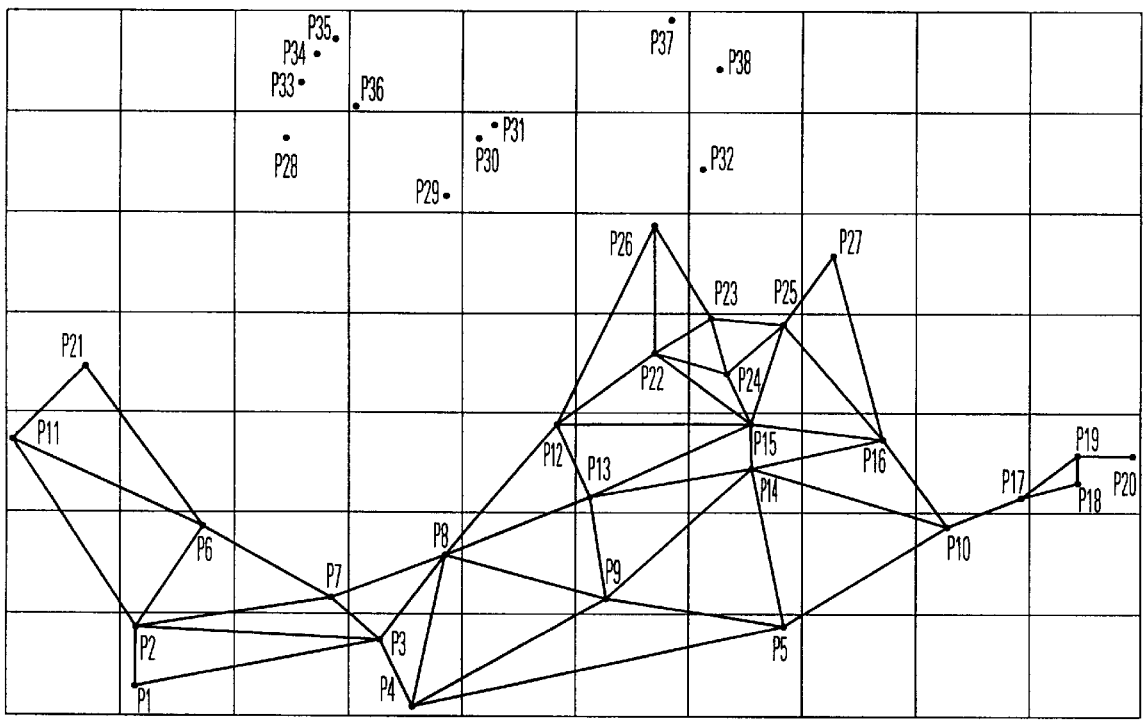
Figure 28:
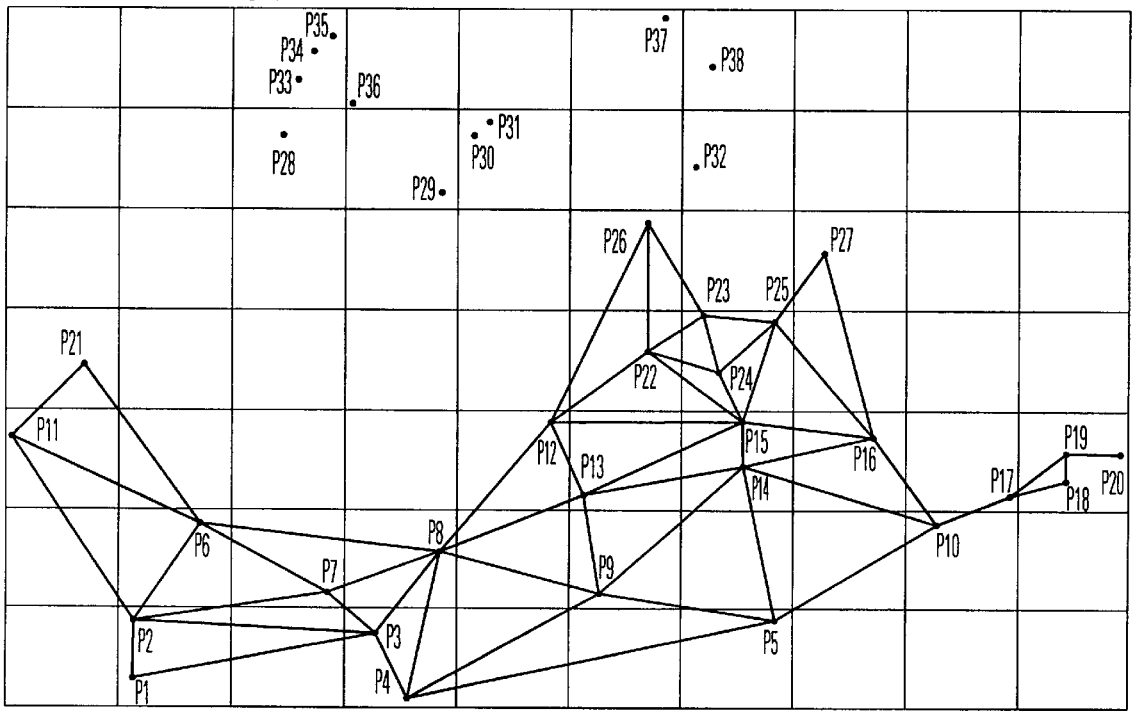

A new point P27 is added in FIG. 27. A new triangle TR(16,25,27) is constructed, found to satisfy the Thin Vertical Triangle Test, and tentatively added to the model. The top list is now P11-P21-P6-P7-P8-P12-P22-P26-P23-P25-P27-P16-P10-P17-P19-P20, and the bottom list remains the same.

Figure 29:
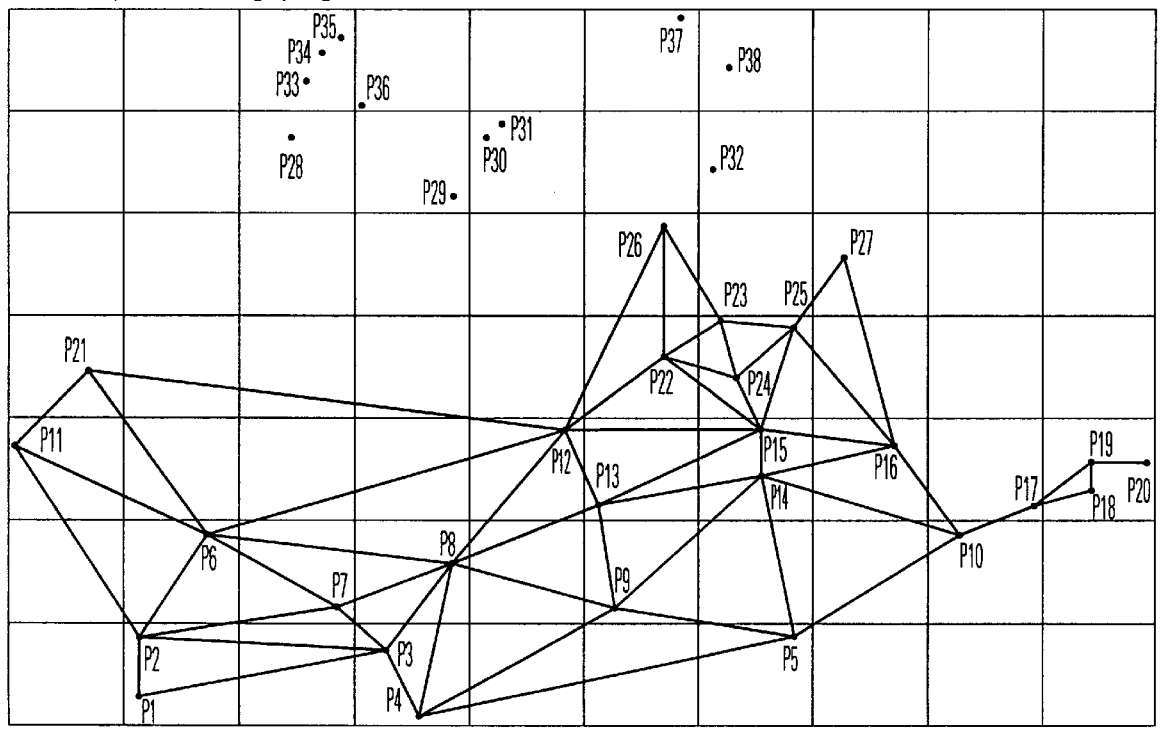

In FIG. 29, new triangles TR(6,7,8), TR(6,8,12) and TR(6,12,21) are constructed, found to satisfy a "good enough" test, and tentatively added to the model. This fills in a portion of the gap between the next new point P28 and the nearest top list edge lying under this new point. The top list now includes P11-P21-P12-P26-P23-P25-P27-P16-P10-P17-P19-P20, and the bottom list remains the same.

Figure 30:
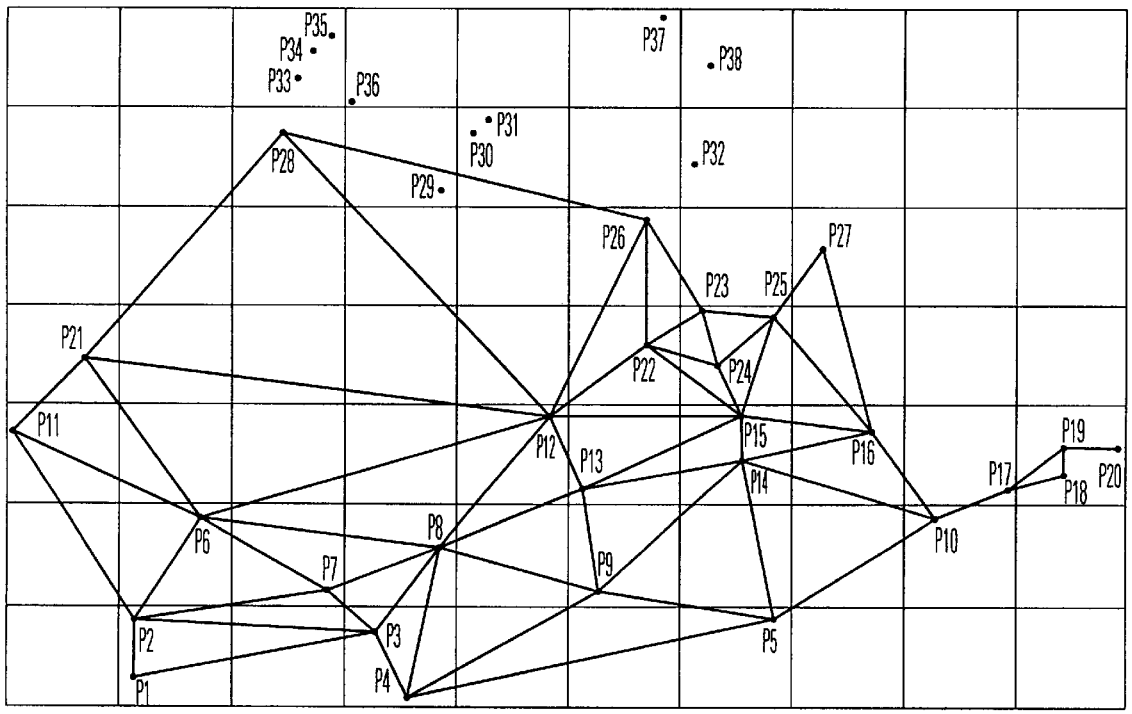
Figure 31:
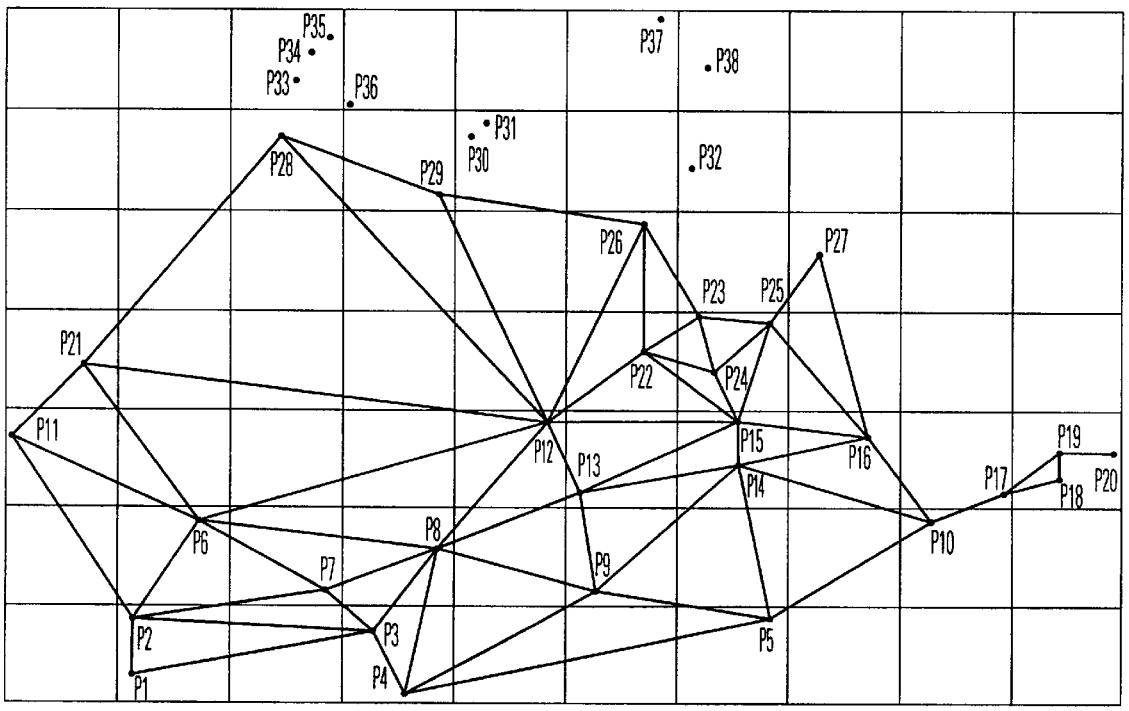

In FIG. 30, a new point P28 is added. Two new triangles, TR(12,21,28) and TR(12,26,28), are constructed, found to individually satisfy the Thin Vertical Triangle Test, and tentatively added to the model. The triangle TR(12,21,28), in combination with a new point P29 introduced in FIG. 31, satisfies the Internal Angle Test, but the triangle TR(12,26,28) in combination with the new point P29 does not satisfy this test. The triangle TR(12,26,28) is, therefore, replaced by new triangles, TR(12,26,29) and TR(12,28,29), which individually satisfy the Thin Vertical Triangle Test and are tentatively added to the model. The top list now includes P11-P21-P28-P29-P26-P12-P22-P23-P25-P27-P16-P10-P17-P19-P20, and the bottom list remains the same.

Figure 32:
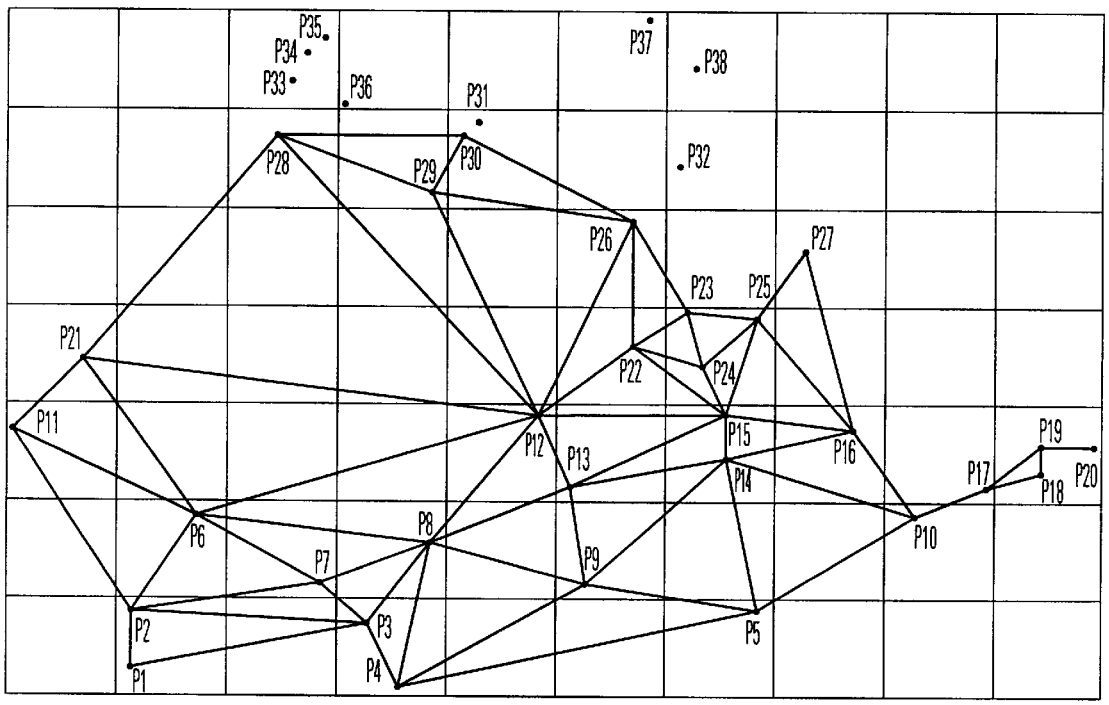
Figure 33:
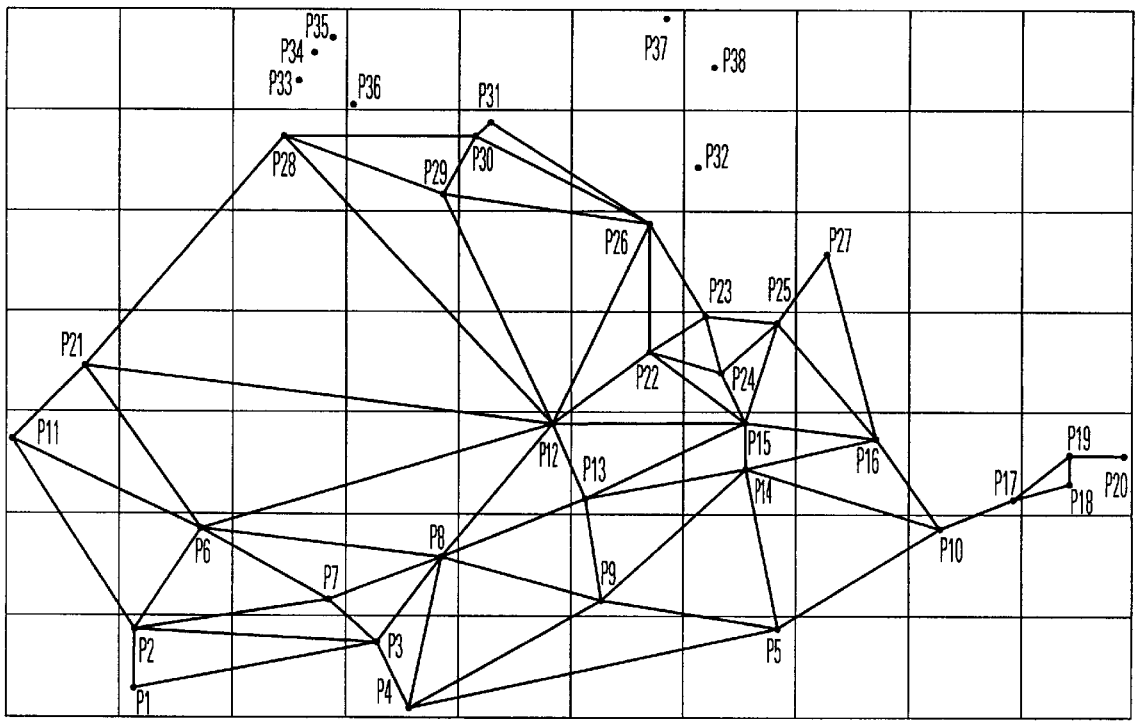

A new point P30 is added in FIG. 32. New triangles TR(26,29,30) and TR(28,29,30) are constructed, found to individually satisfy the Thin Vertical Triangle Test, and tentatively added to the model. In FIG. 33, a new point P31 is added. A new triangle TR(26,30,31) is constructed, found to satisfy the Thin Vertical Triangle Test, and tentatively added to the model. The top list is now P11-P21-P28-P29-P30-P31-P26-P23-P25-P27-P16-P10-P17-P19-P20, and the bottom list remains the same.

Figure 34:
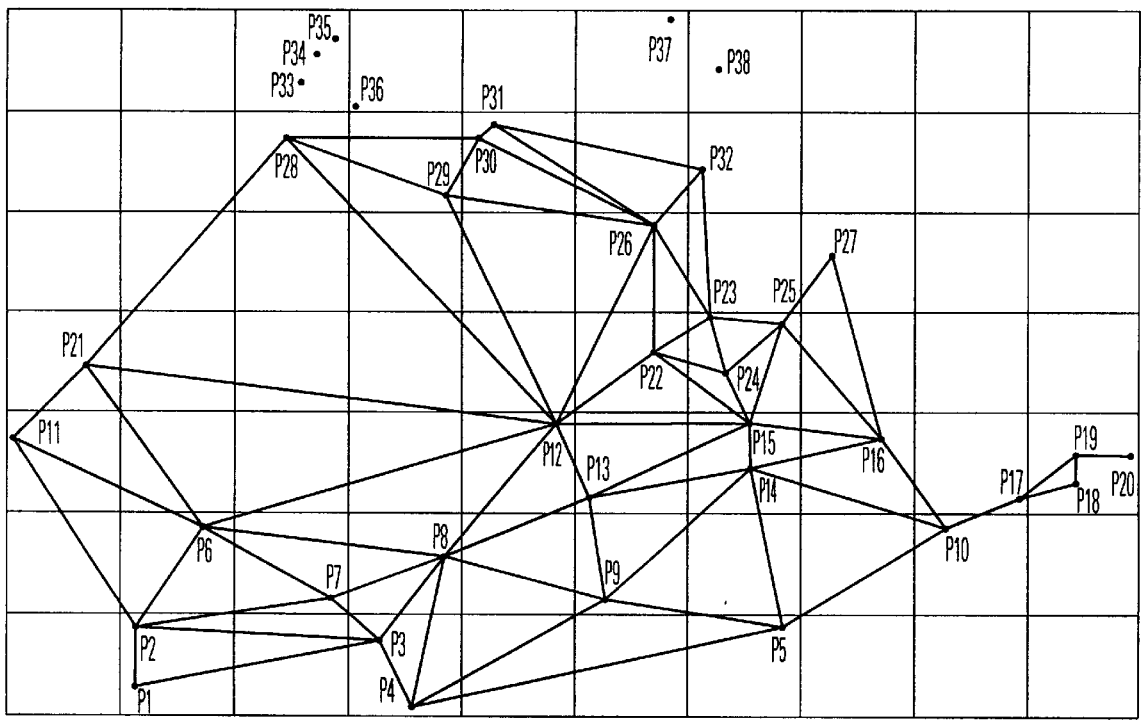
Figure 35:
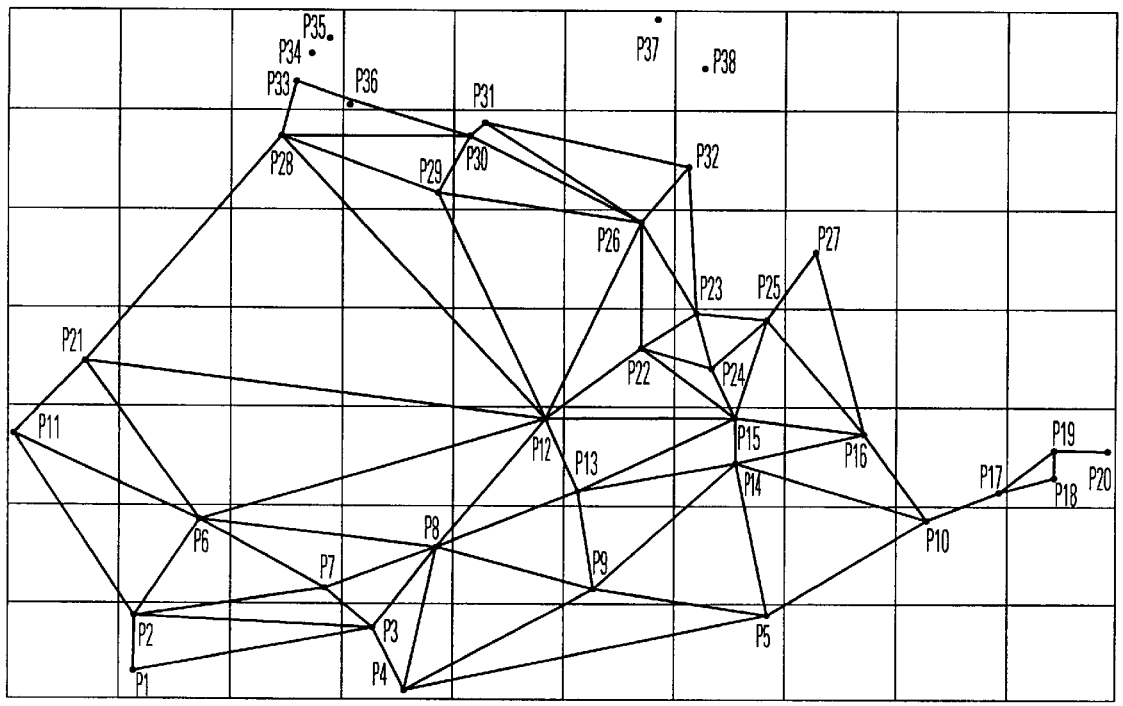
Figure 36:
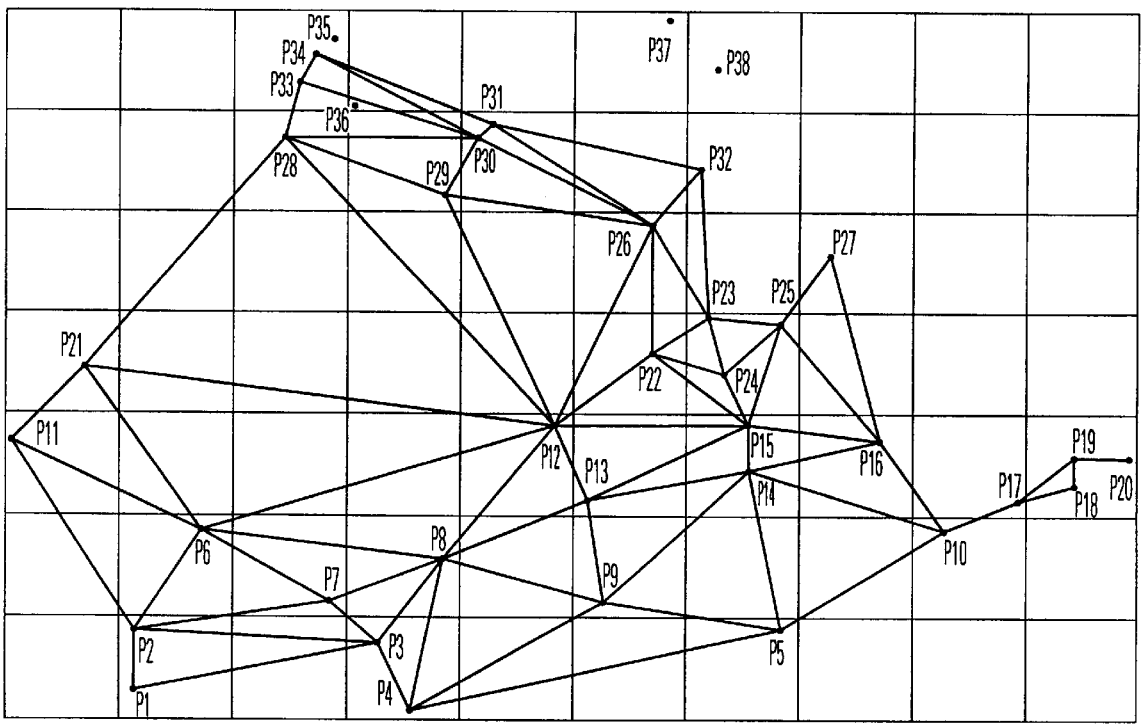

In FIG. 34, a new point P32 is added. Two new triangles, TR(26,31,32) and TR(23,26,32), are constructed, found to individually satisfy the Thin Vertical Triangle Test, and tentatively added to the model. A new point P33 is added in FIG. 35. A new triangle TR(28,30,33) is constructed, found to satisfy the Thin Vertical Triangle Test, and tentatively added to the model. The top list is now P11-P21-P28-P33-P30-P31-P32-P23-P25-P27-P16-P10-P17-P19-P20, and the bottom list remains the same.

Figure 37:
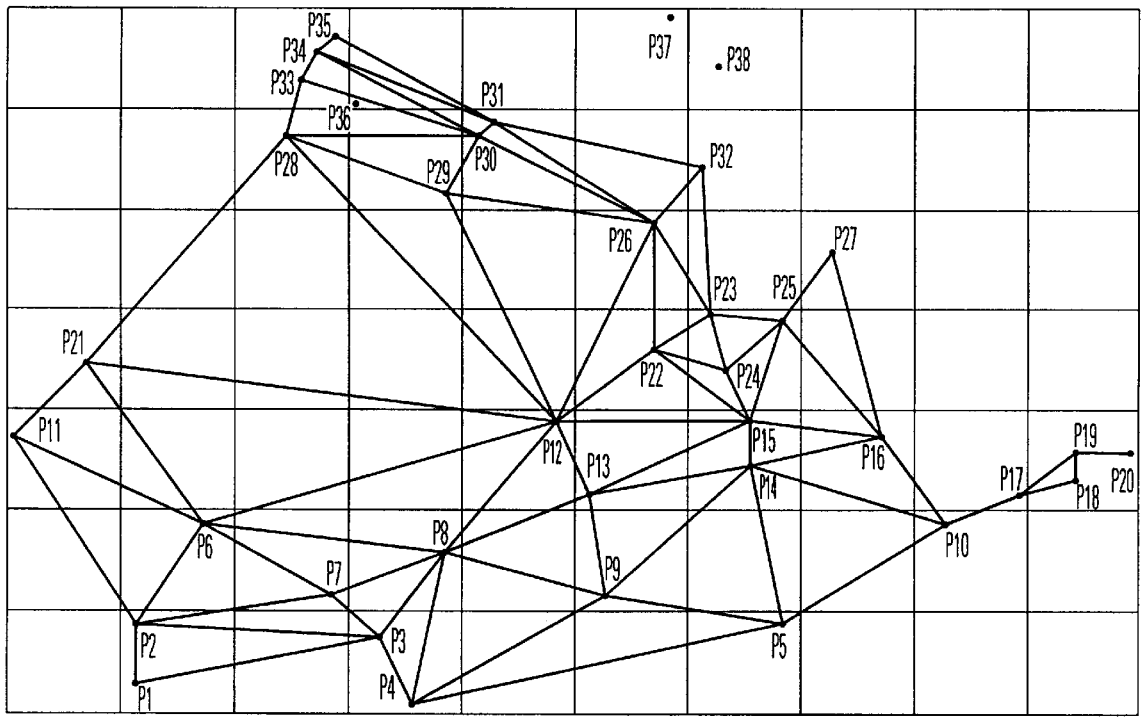

New points, P34 and P35, are added in FIG. 37. New triangles, TR(30,33,34) and TR(30,31,34) and TR(31,34,35) are constructed, found to individually satisfy the Thin Vertical Triangle Test, and tentatively added to the model. The top list is now P11-P21-P28-P33-P34-P35-P31-P32-P23-P25-P27-P16-P10-P17-P19-P20, and the bottom list remains the same.

Figure 38:
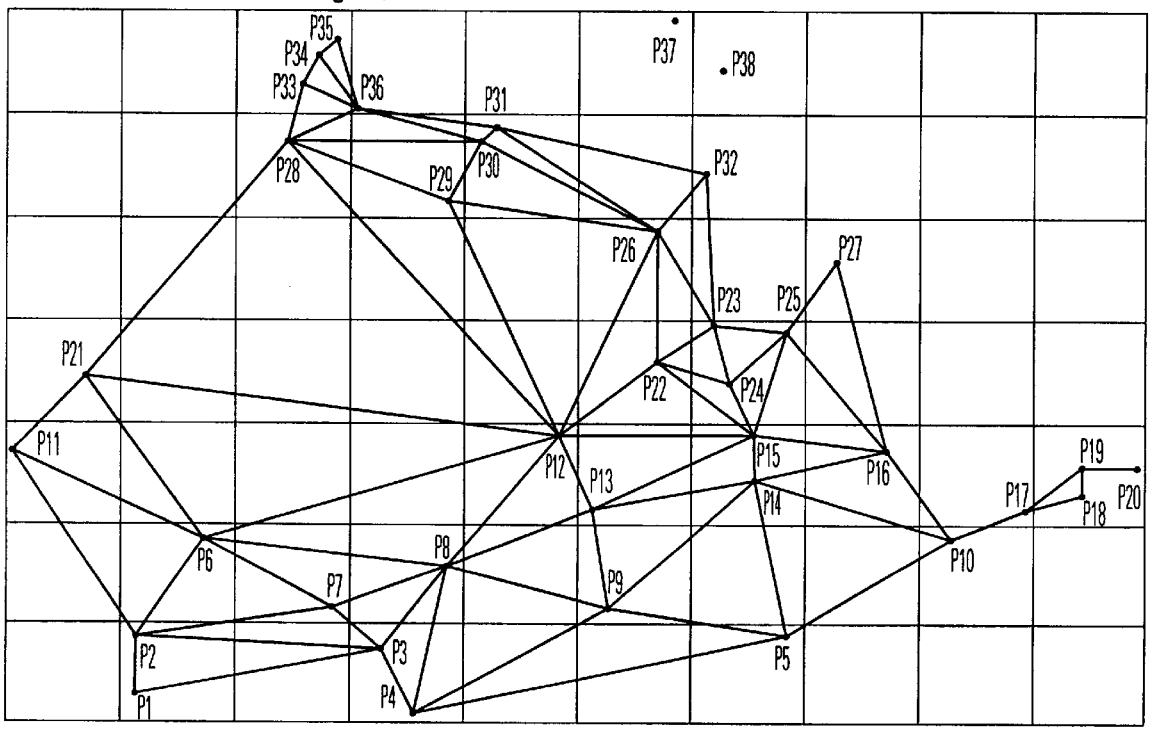

When a new point P36 is introduced, in FIG. 38, this new point, when tested in combination with each of the triangles TR(30,33,34), TR(28,30,31), TR(30,31,34) and TR(31,34, 35), is found not to satisfy the Internal Angle Test for any of these triangles. The triangles TR(30,33,34), TR(28,30,31), TR(30,31,34) and TR(31,34,35) are, therefore, deleted from the model and are replaced in FIG. 39 by the triangles TR(28,30,36), TR(28,33,36), TR(30,31,36), TR(33,34,36) and TR(34,35,36), which are tentatively added to the model. The top list now includes P11-P21-P28-P33-P34-P35-P36-P31-P32-P23-P25-P27-P16-P10-P17-P19-P20, and the bottom list remains the same.

Figure 39:
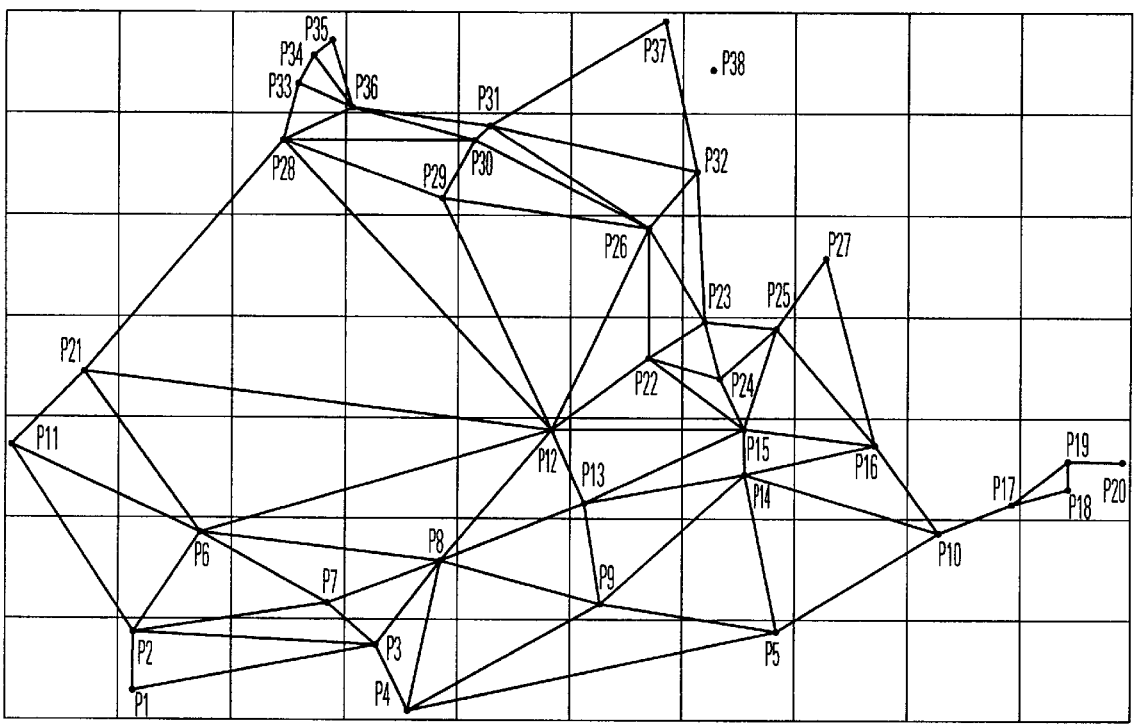
Figure 40:
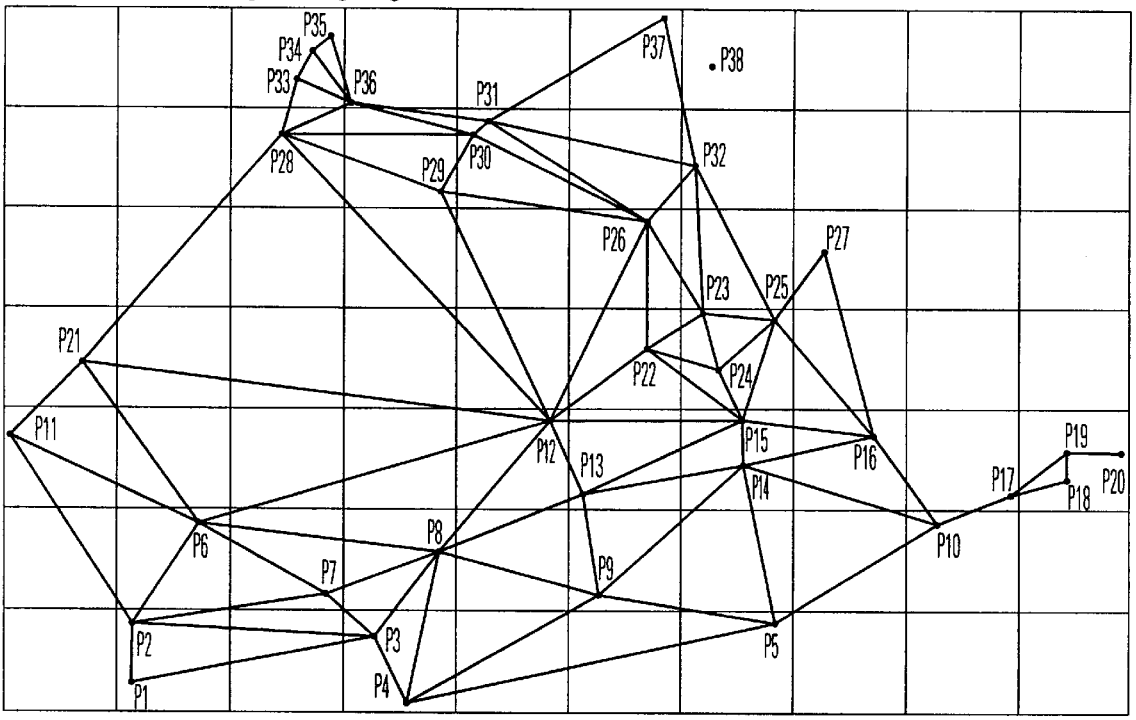

With the addition of a new point P37 in FIG. 39, a new triangle TR(31,32,37) is constructed, which is found to satisfy the Thin Vertical Triangle Test and is tentatively added to the model. The top list now includes P11-P21-P28-P33-P34-P35-P36-P31-P37-P32-P23-P25-P27-P16-P10-P17-P19-P20, and the bottom list remains the same.

Figure 41:
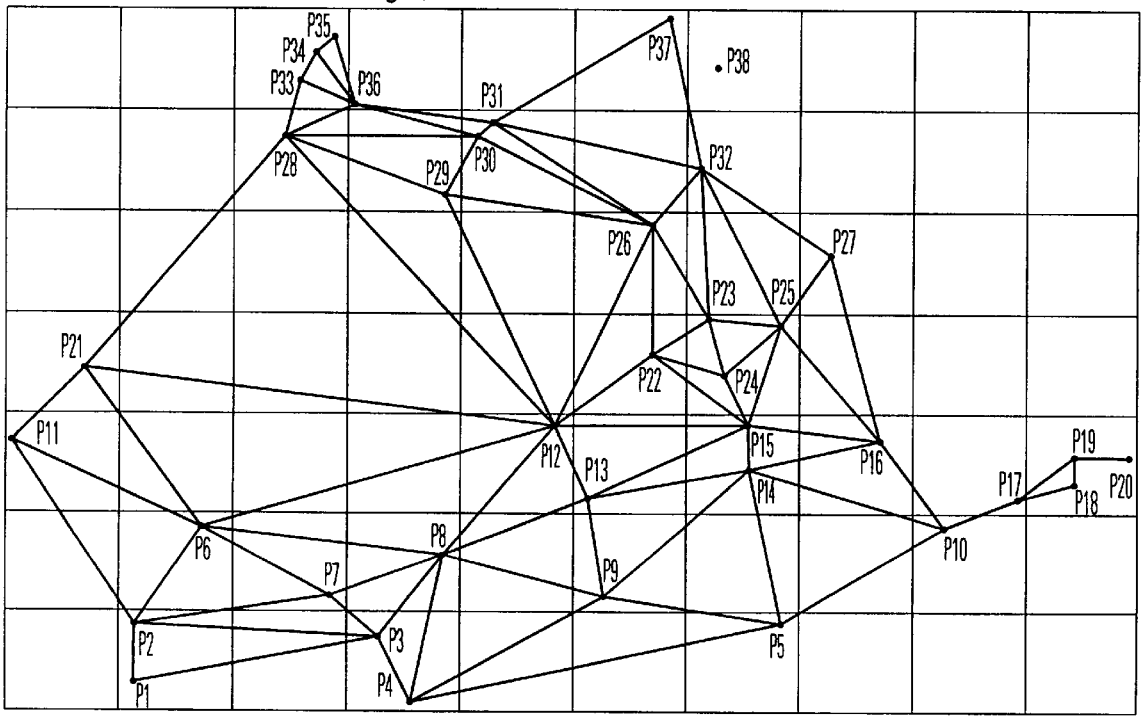

A new point P38 is added in FIG. 41. A candidate triangle TR(23,25,38) fails the Thin Vertical Triangle Test. Before the new point P38 is added, the "good enough" test is applied to a triangle TR(23,25,32). As a result of the "good enough" test, the triangle TR(23,25,32) is tentatively added to the model. The top list and bottom list remain the same. Another triangle, TR(25,27,32), is found to satisfy the Acute Angle Test and is tentatively added to the model.

Figure 42:
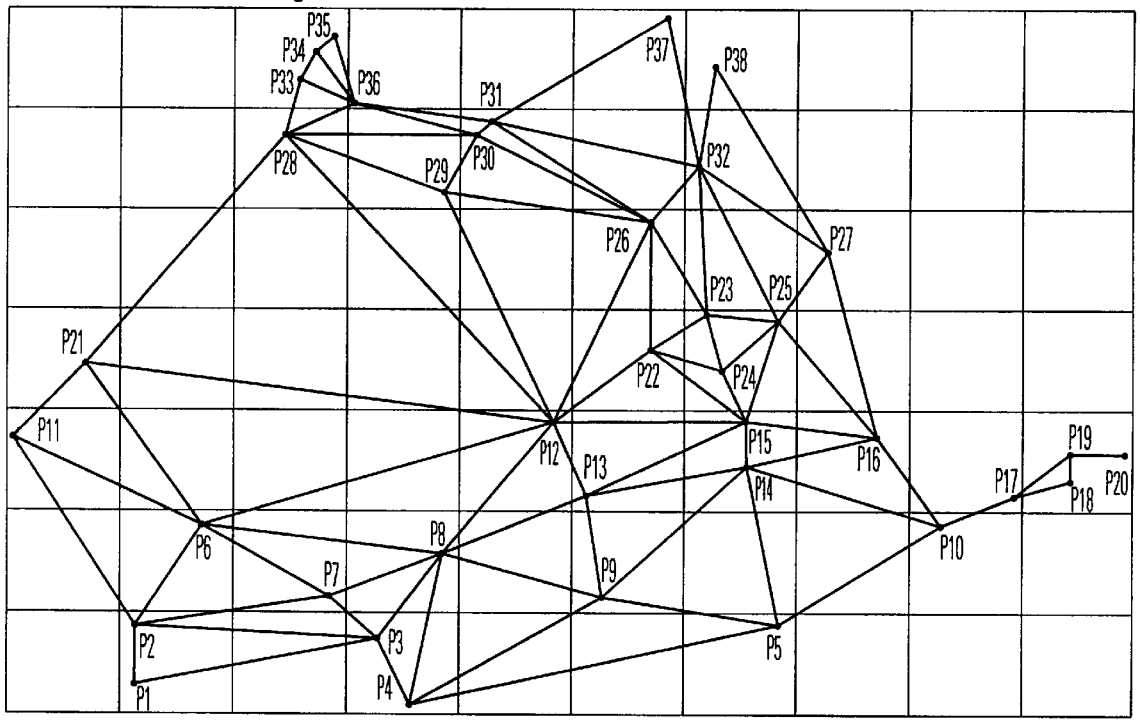

In FIG. 42, a new triangle TR(27,32,38) is constructed, found to satisfy the Thin Vertical Triangle Test, and tentatively added to the model. A candidate triangle TR(32,37,38) fails the Thin Vertical Triangle Test and is not added to the model. The top list now includes P11-P21-P28-P33-P34-P35-P36-P31-P37-P32-P38-P27-P16-P10-P17-P19-P20, and the bottom list remains the same.

Figure 43:
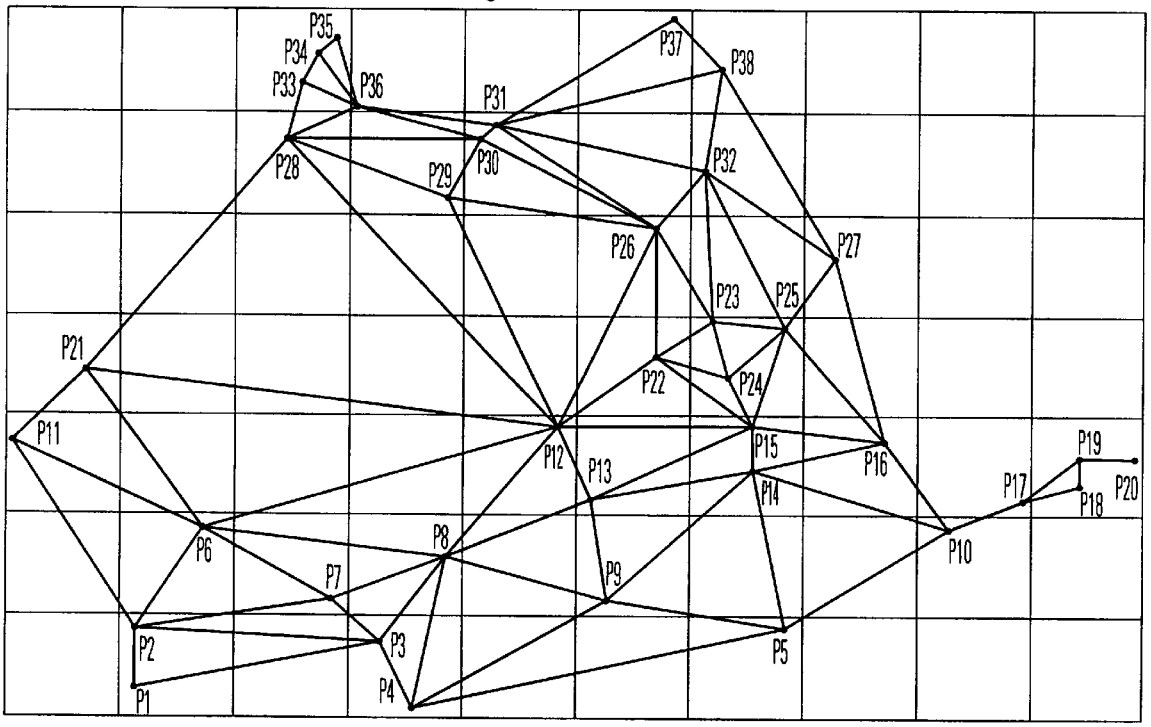

In FIG. 43, the new point P38 is tested in combination with the triangle TR(31,32,37) and found to fail the Internal Angle Test. The triangle TRE(31,32,37) is, therefore, deleted from the model and is replaced by two new triangles, TR(31,32,38) and TR(31,37,38), which are individually found to satisfy the Thin Vertical Triangle Test and are tentatively added to the model. The top list now includes P11-P21-P28-P33-P34-P35-P36-P31-P37-P38-P27-P16-P10-P17-P19-P20, and the bottom list remains the same.

The top list of edges and the bottom list of edges are connected or concatenated to form a cyclic or circular edge list, and this circular edge list is processed separately.

Figure 44:
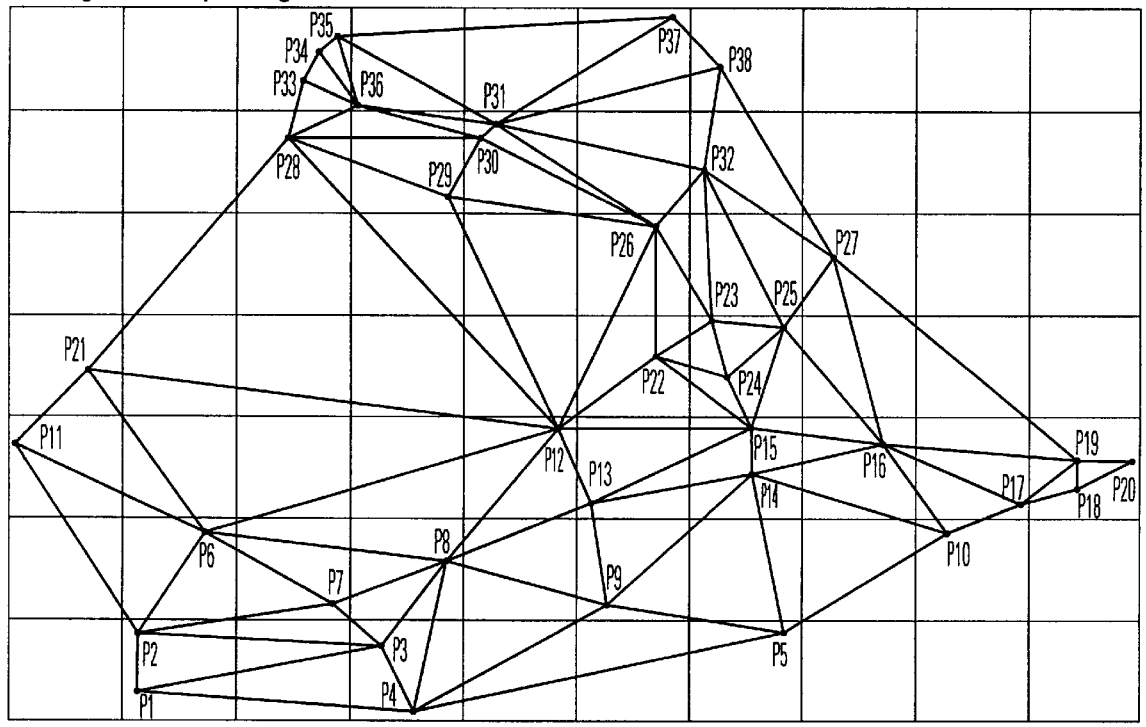

In FIG. 44, seven new triangles, TR(1,3,4), TR(10,16,17), TR(16,17,19), TR(16,19,27), TR(18,19,20), TR(31,35,36) and TR(31,35,37) are constructed, found to individually satisfy the "good enough" test, and tentatively added to the model. The top list is now P11-P21-P28-P33-P34-P35-P37-P38-P27-P16-P10-P17-P19-P20, and the bottom list is P20-P19-P18-P17-P10-P5-P4-P3-P1-P2-P11.

FIG. 44 represents the triangulation model for the 38 points, constructed according to one embodiment of the invention. Within each of the seven horizontal rows of cells, the points in that row are numbered consecutively according to Eqs. (6A) and (6B). If another point were added to one of the rows, or if one of the points were removed from, or moved within, the dataset P, the numbering scheme could change and/or the triangulation model could change markedly.

Table 1 compares the time required $\Delta t(inven)$ to obtain an acceptable triangulation using the invention with the time required $\Delta t(conven)$ to obtain an acceptable triangulation using a conventional approach, for seven representative situations and presents the ratios $\Delta t(inven)/\Delta t(conven)$.

TABLE 1

Comparison of required computation times.

| Number of points N | $\Delta t(inven)$ | $\Delta t(conven)$ | Ratio |
| --- | --- | --- | --- |
| 1,000 | 0.78 sec | 1.58 sec | 0.494 |
| 2,000 | 1.42 | 3.47 | 0.409 |
| 3,000 | 2.15 | 5.24 | 0.410 |
| 4,000 | 2.80 | 6.81 | 0.411 |
| 6,000 | 4.33 | 10.56 | 0.410 |
| 8,000 | 6.01 | 14.43 | 0.416 |
| 10,000 | 7.51 | 18.57 | 0.404 |

From these numerical results it is seen that (1) the invention provides a triangulation in less than half the time required by a conventional approach for $N \geq 1,000$ points and (2) for $N \geq 2,000$ points, the ratio of the required times is about 41 percent. This is a substantial improvement over a conventional method.

Optionally, the system may display the dataset of points P and the set TR of triangles that provide a triangulation according to the procedure discussed in the preceding. Optionally, the system may also display one or more of the candidate triangles (not a part of the set TR) that were found to fail the Acute Angle Test, the Good Enough Test, the Thin Vertical Angle Test and/or the Internal Angle Test. If the user wishes to incorporate a particular triangle in the set TR that is not present, because the desired triangle has failed one or more of the four tests, the user would have an option of moving at least one point in the dataset P on the display so that the desired triangle does not fail one or more of the four tests and is included in the (new) triangulation set TR.

Figure 45A:
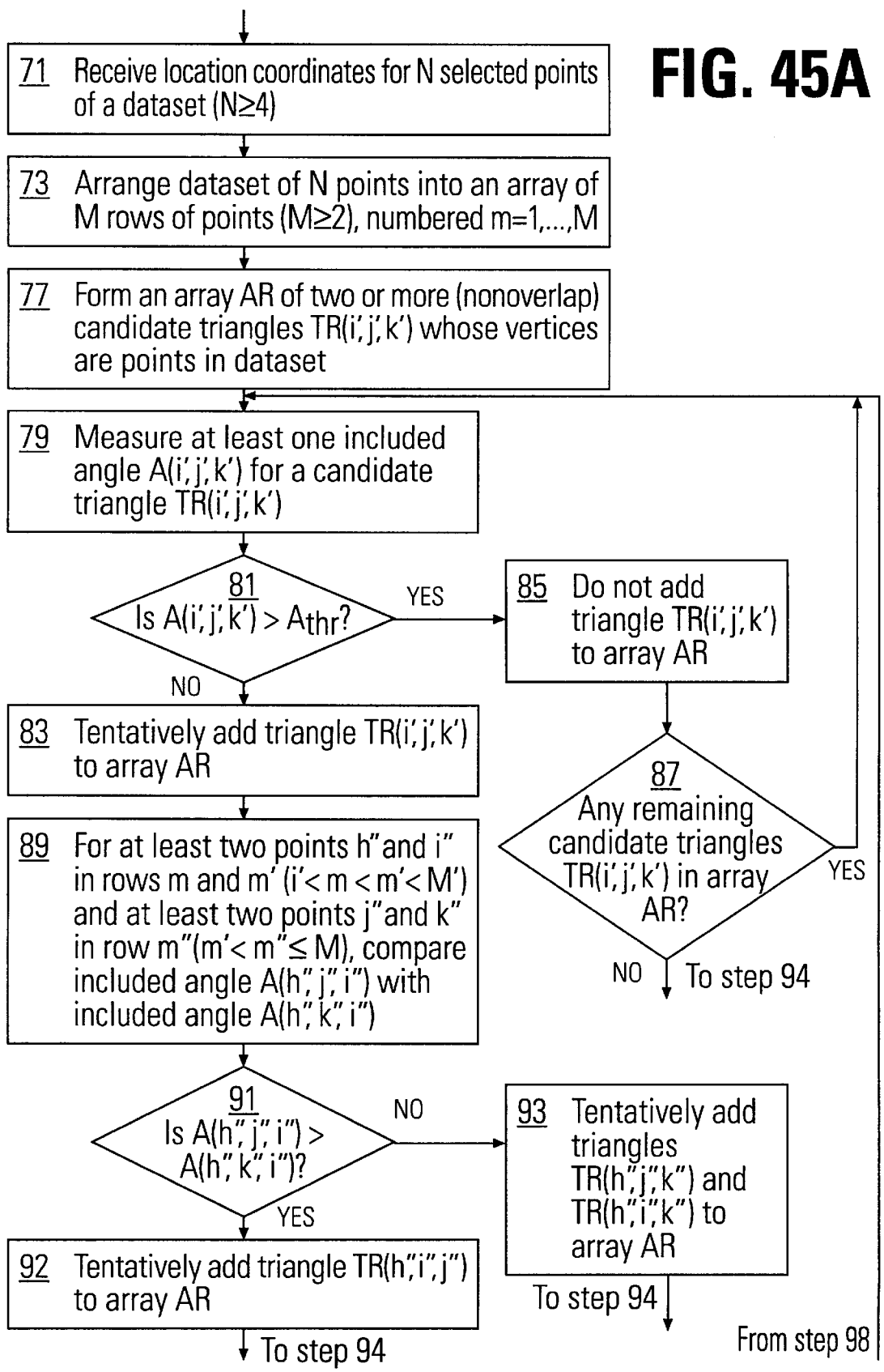
FIG. 45 is a flow chart illustrating a procedure for triangulation according to the invention.
Figure 45B:
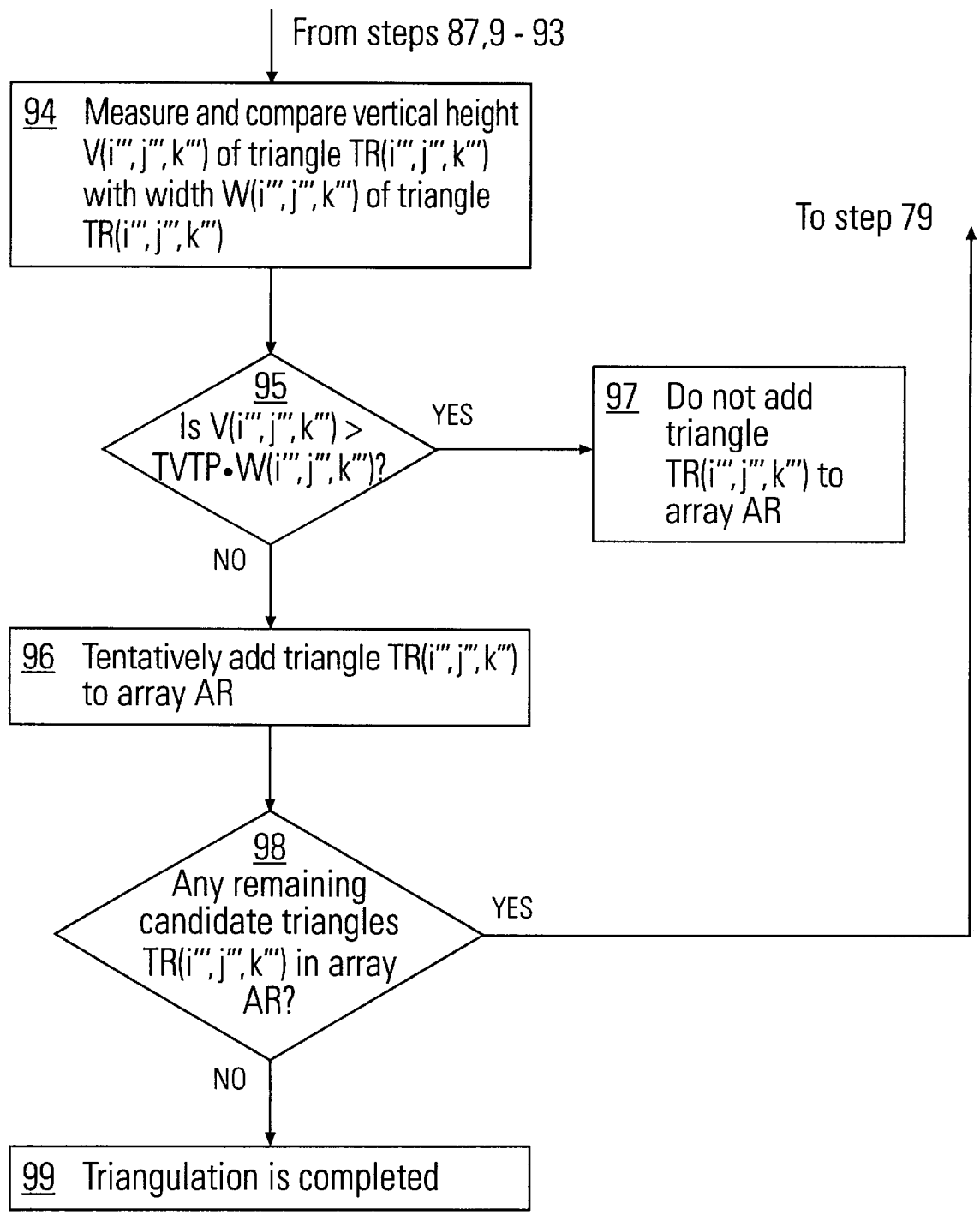

FIG. 45 is a flow chart illustrating a suitable procedure according to the invention. In step 71, location coordinates for a sequence of N non-coincident points, numbered n=1, . . . , N, are received. In step 73, the N locations are arranged into a (candidate) dataset, in an array of rows of cells and the rows are numbered consecutively m=1, . . . , M. In step 77, an array AR of two or more candidate triangles TR(i',j',k') that are part of the dataset is formed, where each of the points in the dataset is a vertex of at least one triangle in AR, where any two ("nonoverlap") triangles in AR have at most a triangle border or a triangle vertex in common. A triangle TR(i',j',k') in the array AR is defined by three line segments L(i',j'), L(j',k') and L(k',i'), where a line segment L(i',j') extends between a point or vertex numbered i' and a point or vertex numbered j'. At least one included angle A(i',j',k'), defined by two intersecting line segments L(i',j') and L(j',k') is measured for each candidate triangle TR(i',j', k'), in step 79.

In step 81, an included angle A(i',j',k') is compared with a selected threshold angle $A_{thr}$ for at least one candidate triangle TR(i',j',k'). If the included angle A(i',j',k') is not greater than the threshold angle $A_{thr}$, the triangle TR(i''',j''', k''') is tentatively added to the array AR, in step 83, and the system moves to step 89.

If the included angle A(i',j',k') is greater than the threshold angle $A_{thr}$, the candidate triangle A(i',j',k') is not added to the array AR, in step 85, and the system determines, in step 87, whether any remaining candidate triangles TR(i',j';k') remain to be subjected to the comparison test in step 81. If the answer to the question in step 87 is "yes," the system returns or recycles to step 79 and continues. If the answer to the question in step 87 is "no," the system moves to step 94.

In step 89, for at least two points numbered h" and i" in the dataset (1≦h'<i") contained in a row m and a row m' (1≦m<m'<M), respectively, and for at least two points j" and k" in the dataset (i"<j"<k") contained in row m" (m'<m"≦M), an included angle A(h",j",i"), is measured and compared with an included angle A(h",k",i").

In step 91, the system determines whether the included angle A(h",j",i") is at least as large as the included angle A(h",k",i"). If the included angle A(h",k",i") is at least as large as the included angle A((h",k",i"), the triangle TR(h", i",j") is tentatively added to the array AR, in step 92, and the system moves to step 94. If the included angle A(h",k",i") is not at least as large as the included angle A((h",k",i"), the triangles TR(h",j",k") and TR(h",i",k"), but not the triangle TR(h",i",j"), are added to the array AR, in step 93, and the system moves to step 94.

In steps 94 and 95, for at least three distinct points i'", j'" and k'" in the dataset, the vertical height V(i'",j'",k'") of the triangle TR(i'",j'",k'") is measured and compared with a comparison value, equal to the width W(i'",j'",k'") of the triangle TR(i'",j'",k'") multiplied by a selected threshold numerical value TVTP (TVTP≧1, preferably TVTP≧3). When the height V(i'",j'",k'") of the triangle TR(i'",j'",k'") is not greater than the comparison value, the triangle TR(i'", j'",k'") is tentatively added to the array AR, in step 96, and the system moves to step 98. When the height V(i'",j'",k'") of the triangle TR(i'",j'",k'") is greater than the comparison value, the triangle TR(i'",j'",k'") is not added to the array AR, in step 97, and the system moves to step 98.

In step 98, the system determines whether any remaining candidtae triangles TR(i',j';k') remain to be subjected to the comparison test in step 95? If the answer to the quation in step 98, is "no," the triangulation is complete, as indicated in step 99. If the answer to the question is step 98 is "yes," the syetm returns or recycles to step 79 and continues.

Figure 46:
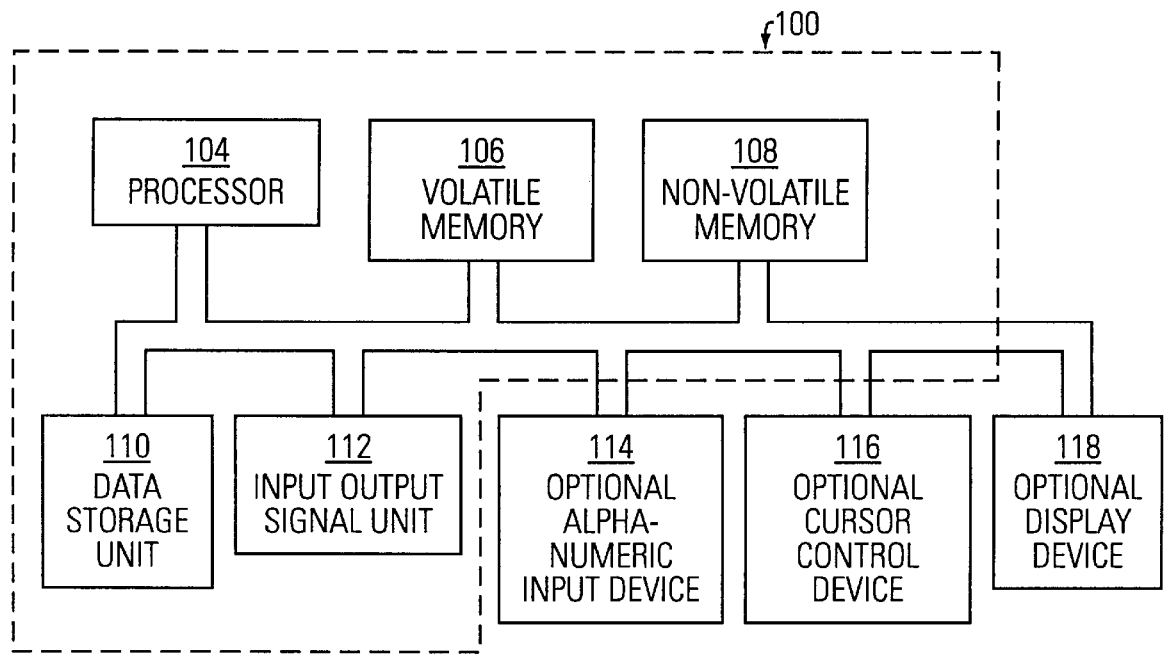
FIG. 46 is a schematic view of a suitable computer system for practicing the invention.

Portions of the hybrid method of the invention include computer-readable and computer-executable instructions that reside, for example, in computer-usable media of a computer system. FIG. 46 illustrates an exemplary computer system 100 used to perform the hybrid method in accordance with an embodiment of the present invention. The system 100 in FIG. 45 is exemplary only; the present invention can operate within a number of different computer systems including general purpose computers systems, embedded computer systems, and stand alone layout editors or automated pattern generator computer systems specially adapted for the hybrid method.

The system 100 of FIG. 46 includes an address/data bus 102 for communicating information, and a central processor unit or CPU 104 coupled to the bus for processing information and instructions. The system 100 also incudes data storage apparati, such as a computer-usable volatile memory 106 (e.g., random access memory or RAM), coupled to the bus 102 for storing information and instructions for the CPU 104, a computer-usable non-volatile memory 108 (e.g., read only memory or ROM), coupled to the bus for storing static information and instructions for the CPU, and a data storage device 110 (e.g., a magnetic or optical disk and disk drive), coupled to the bus for storing information and instructions.

A signal input/output communications device 112 (e.g., a modem, serial port or parallel port) coupled to the bus 102 is optionally included in the system 100 in FIG. 5.

The system 100 of the present invention optionally includes an alphanumeric input device 114, including alphanumeric keys and function keys, coupled to the bus 102 for communicating information and command selections to the CPU 104. The system 100 optionally includes a cursor control device 116 coupled to the bus 102 for communicating user input information and command selections to the CPU 104. The system 100 of the present embodiment optionally includes a display device 118 coupled to the bus 102 for displaying information.

The display device 118 in FIG. 5 may be a liquid crystal device, cathode ray tube, or other display device suitable for creating graphic images and alphanumeric characters recognizable to a user. The cursor control device 116 allows the computer user to dynamically represent two-dimensional movement of a visible symbol (cursor) on a display screen of the display device 118. Many implementations of the cursor control device 116 are known in the art, including a trackball, mouse, touch pad, joystick or special keys on the alphanumeric input device 114 capable of representing movement of a given direction or manner of displacement. Alternatively, a cursor can be directed and/or activated via input from the alphanumeric input device 114, using special keys and/or key sequence commands. The present invention is also suitable for directing a cursor by other means such as, for example, voice commands.

I claim:

1. A method for rapid decomposition of a region into an array of triangles, the method comprising the steps of:

arranging N non-coincident points (N≧4), numbered n=1, 2, . . . , N, in a dataset, which have location coordinates (xi, yi) with i=1, 2, . . . , N, into an array of rows of cells, with the rows being numbered consecutively m=1, 2, . . . , M, where at least two of the points belong to different rows, where row number j contains N(j) points of the data set, and where the points within row m are numbered consecutively in a selected direction i=N(m−1)+1, . . . , N(m);

constructing an array AR of two or more triangles TR(i'j', k'), defined by three distinct points numbered i', j' and k' from the dataset points, with 1≦i'<j'<k'≦N, where each of the points in the dataset is a vertex of at least one of the sequence of triangles, where any two triangles in the array AR have at most a triangle border or a triangle vertex in common, and where the triangle TR(i',j,'k') is defined by three line segments L(i',j'), L(j',k') and L(k',i') and a line segment L(i',j') extends between a vertex numbered i' and a vertex numbered j';

for at least three distinct points numbered i"", j"" and k"" in the dataset, comparing an included angle A(i"", j"",k""), defined by intersecting line segments L(i"", j"") and L(j"", k""), with a selected threshold angle value $A_{thr}$, and when the included angle A(i"",j"",k"") is not greater than $A_{thr}$, adding the triangle TR(i"", j"", k"") to the array AR;

for at least two points numbered h" and i" in the dataset contained in a row m and row m', respectively, with 1≦h"<i"≦N, and for at least two points j" and k" in the dataset contained in row m", with i"<j"<k" and m≦m'<m", comparing an included angle A(h", j", i"), defined by intersecting line segments L(h", j") and L(j", i"), and an included angle A(h", k", i" ), defined by intersecting line segments L(h", k") and L(k", i");

when the angle A(h",j",i") is a least as large as the angle A(h", k", i"), adding the triangle TR(h", i", j,"), to the array AR;

when the angle A(h", j", k") and TR(h", i", k"), but not the triangle TR(h", i", j"), to the array AR;

for at least three distinct points i"", j"" and k"" in the dataset, comparing the height of the triangle TR(i"", j"", k"") with a comparison value equal to the width of the triangle TR(i"", j"", k"") multiplied by a selected threshold numerical value TVTP, and adding the triangle TR(i"", j"", k"") to the array AR only when the height of the triangle TR(i"", j"", k"") is not greater than the comparison value; and choosing said selected threshold angle value to be approximately 90°.

2. The method of claim 1, further comprising the step of choosing said selected direction to be the x-coordinate direction.

3. The method of claim 1, further comprising the step of choosing said selected direction to be the y-coordinate direction.

4. The method of claim 1, further comprising the step of choosing said selected threshold angle value to be between 90° and 180°.

5. The method of claim 1, further comprising the step of choosing said selected threshold numerical value TVTP to be substantially greater than 1.

6. The method of claim 1, further comprising the step of choosing said selected threshold numerical value TVTP to be at least equal to 3.

7. The method of claim 1, further comprising the step of displaying said dataset of N non-coincident points.

8. The method of claim 7, further comprising the step of displaying at least one triangle in said array AR.

9. A computer-usable medium having computer-readable program code embedded therein for causing a computer to rapidly determine a triangulation of a region using a selected set of four or more points by performing the steps of:

arranging N non-coincident points (N≧4), numbered n=1, 2, ..., N, in a dataset, which have location coordinates (xi, yi) with i=1, 2, ..., N, into an array of rows of cells, with the rows being numbered consecutively m=1, 2, ..., M, where at least two of the points belong to different rows, where row number j contains N(j) points of the data set, and where the points within row m are numbered consecutively in a selected direction i=N(m−1)+1, ..., N(m);

constructing an array AR of two or more triangles TR(i'j', k'), defined by three distinct points numbered i', j' and k' from the dataset points, with 1≦i'<j'<k'≦N, where each of the points in the dataset is a vertex of at least one of the sequence of triangles, where any two triangles in the array AR have at most a triangle border or a triangle vertex in common, and where the triangle TR(i'j',k') is defined by three line segments L(i',j'), L(j',k') and L(k',i') and a line segment L(i',j') extends between a vertex numbered i' and a vertex numbered j';

for at least three distinct points numbered i"", j"" and k"" in the dataset, comparing an included angle A(i"", j"", k""), defined by intersecting line segments L(i"", j"") and L(j"", k""), with a selected threshold angle value $A_{thr}$, and when the included angle A(i"",j"",k"") is not greater than $A_{thr}$, adding the triangle TR(i"", j"", k"") to the array AR;

for at least two points numbered h" and i" in the dataset contained in a row m and row m', respectively, with 1≦h"<i"≦N, and for at least two points j" and k" in the dataset contained in row m", with i"<j"<k" and m≦m'<m", comparing an included angle A(h", j", i"), defined by intersecting line segments L(h", j") and L(j", i"), and an included angle A(h", k", i"), defined by intersecting line segments L(h", k") and L(k", i");

when the angle A(h",j",i") is a least as large as the angle A(h", k", i"), adding the triangle TR(h", i", j,"), to the array AR;

when the angle A(h", j", i") is less than the angle A(h", k", I"), adding the triangles TR (h", j", k") and TR (h", j", k"), but not the triangle TR(h", i", j"), to the array AR;

for at least three distinct points i"", j"" and k"" in the dataset, comparing the height of the triangle TR(i"", j"", k"") with a comparison value equal to the width of the triangle TR(i"", j"", k"") multiplied by a selected threshold numerical value TVTP, and adding the triangle TR(i"", j"", k"") to the array AR only when the height of the triangle TR(i"", j"", k"") is not greater than the comparison value; and choosing said selected threshold angle value to be approximately 90°.

10. The computer-usable medium of claim 9, wherein said computer-readable program code further causes said computer to choose said selected threshold angle value to be between 90° and 180°.

11. The computer-usable medium of claim 9, wherein said computer-readable program code further causes said computer to choose said selected threshold numerical value TVTP to be substantially greater than 1.

12. The computer-usable medium of claim 9, wherein said computer-readable program code further causes said computer to choose said selected threshold numerical value TVTP to be at least equal to 3.

13. The computer-usable medium of claim 9, wherein said computer readable program code causes said computer to display said dataset of N non-coincident points.

14. The computer-usable medium of claim 13, wherein said computer readable program code causes said computer to display at least one triangle in said array AR.

15. A computer system comprising:

a computer signal processor;

an address and data bus connected the processor;

a computer-readable memory, connected to the processor, that provides processor instructions that allow the processor to perform the steps of:

arranging N non-coincident points (N≧4), numbered n=1, 2, ..., N, in a dataset, which have location coordinates (xi, yi) with i=1, 2, ..., N, into an array of rows of cells, with the rows being numbered consecutively m=1, 2, ..., M, where at least two of the points belong to different rows, where row number j contains N(j) points of the data set, and where the points within row m are numbered consecutively in a selected direction i=N(m−1)+1, ..., N(m);

constructing an array AR of two or more triangles TR(i'j', k'), defined by three distinct points numbered i', j' and k' from the dataset points, with 1≦i'<j'<k'≦N, where each of the points in the dataset is a vertex of at least one of the sequence of triangles, where any two triangles in the array AR have at most a triangle border or a triangle vertex in common, and where the triangle TR(i'j',k') is defined by three line segments L(i',j'), L(j',k') and L(k',i') and a line segment L(i',j') extends between a vertex numbered i' and a vertex numbered j';

for at least three distinct points numbered i"", j"" and k" in the dataset, comparing an included angle A(i"", j"", k""), defined by intersecting line segments L(i"", j"")

and L(j"", k""), with a selected threshold angle value $A_{thr}$, and when the included angle A(i"",j"",k"") is not greater than $A_{thr}$, adding the triangle TR(i"", j"", k"") to the array AR;

for at least two points numbered h" and i" in the dataset contained in a row m and row m', respectively, with $1 \leq h" < i" \leq N$, and for at least two points j" and k" in the dataset contained in row m", with i"<j"<k" and $m \leq m' < m"$, comparing an included angle A(h", j", i"), defined by intersecting line segments L(h", j") and L(j", i"), and an included angle A(h", k", i"), defined by intersecting line segments L(h", k") and L(k", i");

when the angle A(h",j",i") is a least as large as the angle A(h", k", i"), adding the triangle TR(h", i", j,"), to the array AR;

when the angle A(h", j", i") is less than the angle A(h", k", I"), adding the triangles TR (h", j", k") and TR (h", j", k"), but not the triangle TR(h", i", j"), to the array AR;

for at least three distinct points i"", j"" and k"" in the dataset, comparing the height of the triangle TR(i"", j"", k"") with a comparison value equal to the width of the triangle TR(i"", j"", k"") multiplied by a selected threshold numerical value TVTP, and adding the triangle TR(i"", j"", k"") to the array AR only when the height of the triangle TR(i"", j"", k"") is not greater than the comparison value; and said processor further choosing said selected threshold angle value to be approximately 90°.

16. The computer system of claim 15, wherein said processor further chooses said selected threshold angle value to be between 90° and 180°.

17. The computer system of claim 15, wherein said processor further chooses said selected threshold numerical value to be substantially greater than 1.

18. The computer system of claim 15, wherein said processor further chooses said selected threshold numerical value to be at least equal to 3.

19. The computer system of claim 15, wherein said processor further causes said computer to display said dataset of N non-coincident points.

20. The computer system of claim 19, wherein said processor further causes said computer to display at least one triangle in said array AR.

* * * * *